(12) United States Patent
Winter

(10) Patent No.: US 8,487,764 B2
(45) Date of Patent: Jul. 16, 2013

(54) SYSTEM AND METHOD FOR STEALTH TRACKING

(75) Inventor: Steven J. Winter, Arlington, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 13/592,585

(22) Filed: Aug. 23, 2012

(65) Prior Publication Data

US 2012/0319845 A1    Dec. 20, 2012

Related U.S. Application Data

(62) Division of application No. 12/478,485, filed on Jun. 4, 2009, now Pat. No. 8,274,387.

(60) Provisional application No. 61/058,757, filed on Jun. 4, 2008.

(51) Int. Cl.
*G08B 13/14* (2006.01)

(52) U.S. Cl.
USPC .................................... 340/568.1; 340/568.8

(58) Field of Classification Search
USPC ................................. 340/568.1, 568.8, 539.1
See application file for complete search history.

(56) References Cited

U.S. PATENT DOCUMENTS

2007/0171042 A1*    7/2007    Metes et al. ................... 340/521

* cited by examiner

*Primary Examiner* — Shirley Lu
(74) *Attorney, Agent, or Firm* — Seed IP Law Group PLLC

(57) ABSTRACT

A shipping and tracking system has a number of tracking stations that are geographically distributed. The tracking stations gather information from shipping items processed by the shipping and tracking system. The shipping and tracking system provides an enhanced level of security for selected shipping items. The enhanced level of security for the selected shipping items is based at least on the information gathered at the tracking stations. The enhanced security is provided in such a way that personnel of the shipping and delivery system cannot physically discern whether or not a shipping item is being shipped with enhanced security.

11 Claims, 13 Drawing Sheets

SYSTEM AND METHOD FOR STEALTH TRACKING

CROSS-REFERENCE TO RELATED APPLICATIONS

This application is a division of U.S. patent application Ser. No. 12/478,485, filed Jun. 4, 2009 which claims benefit under 35 U.S.C. 119(e) from U.S. provisional patent application Ser. No. 61/058,757, filed on Jun. 4, 2008, both of which are incorporated herein by reference in their entirety.

BACKGROUND

1. Technical Field

This disclosure generally relates to tracking items and more particularly to surreptitious tracking of items.

2. Description of the Related Art

Shipping and delivery systems may track shipping items as the shipping items are processed through the shipping and delivery system. Some shipping and delivery systems may use shipping labels having machine readable symbols such as a bar code that encodes an identifier. A shipping label is adhered to a shipping item, and the identifier is associated with the shipping item. As the shipping item is passed through various points of the shipping and delivery system, the identifier encoded in bar code on the shipping label is optically read and provided to a tracking system. Some shipping and delivery systems may use shipping labels having radio frequency identifiers that encode respective item identifiers.

Shipping and delivery systems may process shipping items that are of greater financial or sentimental value than other shipping items. The senders or recipients of these more valuable shipping items may desire to have their shipping items handled with greater security than that which is normally offered and/or to insure their shipping items.

BRIEF SUMMARY

There exists a need for a shipping and delivery system to provide selected shipping items with a level of security greater than that provided to unselected shipping items. There exists a need to provide the enhanced security in such a way that personnel of the shipping and delivery system cannot physically discern whether or not a shipping item is being shipped with enhanced security.

At least one embodiment may be summarized as a method of operating a delivery and stealth tracking system, including during a first period of time, wirelessly gathering information indicative of an inherent property of a first wireless communications data provider device physically coupled to the shipping item with a first wireless communications data reader device; during the first period of time, wirelessly gathering information indicative of an inherent property of a second wireless communications data provider device physically coupled to the shipping item with the first wireless communications data reader device; calculating a current joint item-device configuration value based at least on the respective information gathered during the first period of time from both the first and the second wireless communications data provider device; and comparing the current joint item-device configuration value with a reference joint item-device configuration value, wherein the reference joint item-device configuration value was previously calculated based at least on respective information previously gathered during a second period of time preceding the first period of time from both the first and the second wireless communications data provider device. Calculating a current joint item-device configuration value based at least on the respective information gathered during the first period of time from both the first and the second wireless communications data provider device may include determining a respective value of a quantity indicative of the inherent property of the first wireless communications data provider device; determining a respective value of a quantity indicative of the inherent property of the second wireless communications data provider device; and determining a statistical quantity based at least on the determined respective value of the quantity indicative of the inherent property of the first wireless communications data provider device and the determined respective value of the quantity indicative of the inherent property of the second wireless communications data provider device.

Comparing the current joint item-device configuration value with a reference joint item-device configuration value may further include determining whether the current joint item-device configuration value is within a defined amount of tolerance with respect to the reference joint item-device configuration value based at least on the comparison of the current joint item-device configuration value with the reference joint item-device configuration value; and further including providing a tamper-alert in response to the current joint item-device configuration value being outside of the defined amount of tolerance.

The respective inherent property of the first and of the second wireless communications data provider device may be a respective amount of impedance, and calculating a current joint item-device configuration value may be based at least on the respective information gathered during the first period of time from both the first and the second wireless communications data provider device including determining a respective value of a first amount of electromagnetic energy, $E_a$, received from the first wireless communications data provider device during a first period of time having a defined duration; determining a respective value of a second amount of electromagnetic energy, $E_b$, received from the second wireless communications data provider device during a second period of time having a duration that matches the duration of the first period of time; and determining a ratio between the determined respective value of the first amount of electromagnetic energy, $E_a$, and the determined respective value of the first amount of electromagnetic energy, $E_b$.

The method of operating a delivery and stealth tracking system may further include during the second period of time, wirelessly gathering information indicative of an inherent property of a first wireless communications data provider device physically coupled to the shipping item with a second wireless communications data reader device; during the second period of time, wirelessly gathering information indicative of an inherent property of a second wireless communications data provider device physically coupled to the shipping item with the second wireless communications data reader device; calculating the reference joint item-device configuration value based at least on the respective information gathered during the second period of time from both the first and the second wireless communications data provider device; and storing the reference joint item-device configuration value.

The method operating a delivery and stealth tracking system may further include determining a delivery schedule and a delivery path for the shipping item, the delivery path extending between at least a current physical location of the shipping item and a physical destination location, wherein the delivery path includes a number of tracking stations, and the delivery schedule includes a respective estimated delivery time at each respective tracking station of the number of tracking stations; providing a tracking-alarm in response to a failure to gather information indicative of the respective inherent property of at least one of the first and the second wireless communications data provider devices of the shipping item at a respective tracking station of the number of tracking stations within an interval of time that is determined based at least on the respective estimated delivery time at the respective tracking station; and for each tracking station of the number of tracking stations that gathers information from at least one of the first and the second wireless communications data provider devices of the shipping item, updating an item delivery record based at least on the information gathered at the respective tracking station.

The method of operating a delivery and stealth tracking system may further include associating the reference joint item-device configuration value with the shipping item; associating at least one shipping item identifier with the shipping item, wherein at least one of the first and the second wireless communications data provider devices includes a respective memory that stores encoded information indicative of the shipping item identifier; determining a delivery schedule and a delivery path for the shipping item, the delivery path extending between at least a current physical location of the shipping item and a physical destination location, wherein the delivery path includes a number of tracking stations, and the delivery schedule includes a respective estimated delivery time at each respective tracking station of the number of tracking stations; for each tracking station of the number of tracking stations that gathers information from at least one of the first and the second wireless communications data provider devices of the shipping item, receiving information indicative of the shipping item identifier; and for each tracking station of the number of tracking stations that gathers information from at least one of the first and the second wireless communications data provider devices of the shipping item, receiving information indicative of the current joint item-device configuration value. Receiving information indicative of the current joint item-device configuration value may include receiving information gathered at the respective tracking station indicative of an inherent property of the first wireless communications data provider device; and receiving information gathered at the respective tracking station indicative of inherent property of the second wireless communications data provider device.

The method of operating a delivery and stealth tracking system may further include permitting access by a set of authorized personnel to information indicative of the association of the at least one shipping item identifier with the shipping item; and denying access by at least one member of the first set of authorized personnel to information indicative of the association of the reference joint item-device configuration value with the shipping item.

At least one embodiment may be summarized as a surreptitious tracking system for tracking of a shipping item through a shipping and delivery system, including a plurality of tracking stations geographically distributed in the shipping and delivery system, each tracking station configured to wirelessly read a respective shipping-shipping item identifier indicator from a respective shipping item passing through the respective tracking station and configured to wirelessly gather stealth tracking information including an amount of information indicative of an inherent property of a respective first wireless communications data provider device and an amount of information indicative of an inherent property of a respective second wireless communications data provider device of a respective shipping item passing through the respective tracking station; and a stealth tracking system communicatively coupled to each tracking station of the plurality of tracking stations, the stealth tracking station configured to: calculate a current joint item-device configuration value based at least on stealth tracking information received from a tracking station of the plurality of tracking stations, and compare the current joint item-device configuration value with a reference joint item-device configuration value.

The calculation of a current joint item-device configuration value by the stealth tracking system may further include the stealth tracking station being configured to: determine a respective value of a quantity indicative of the inherent property of the first wireless communications data provider device based at least on the received stealth tracking information; determine a respective value of a quantity indicative of the inherent property of the second wireless communications data provider device based at least on the received stealth tracking information; and determine a statistical quantity based at least on the determined respective value of the quantity indicative of the inherent property of the first wireless communications data provider device and the determined respective value of the quantity indicative of the inherent property of the second wireless communications data provider device.

The stealth tracking system may be further configured to calculate the reference joint item-device configuration value based at least on stealth tracking information gathered during an initial check-in of a respective shipping item into the shipping and delivery system; and store the reference joint item-device configuration value.

The stealth tracking system may be further configured to determine a delivery schedule and a delivery path for a respective shipping item, the delivery path extending between at least a current physical location of the respective shipping item and a physical destination location, wherein the delivery path includes a number of tracking stations, and the delivery schedule includes a respective estimated delivery time at each respective tracking station of the number of tracking stations; provide a tracking-alarm in response to a failure to gather stealth tracking information at a respective tracking station of the number of tracking stations within an interval of time that is determined based at least on the respective estimated delivery time at the respective tracking station; and for each tracking station of the number of tracking stations that gathers stealth tracking information from the respective shipping item, update a respective item delivery record based at least on the stealth tracking information gathered at the respective tracking station.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with delivery systems, tracking systems, wireless communications data provider devices, wireless communications data reader devices and/or with computer/computing systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions, or acts. In alternative embodiments various logical functions, or acts may be executed out of order from that shown or discussed, including substantially concurrently or in reverse order, and/or manually, depending on the functionality involved, as would be understood by those reasonably skilled in the art.

Figure 1:
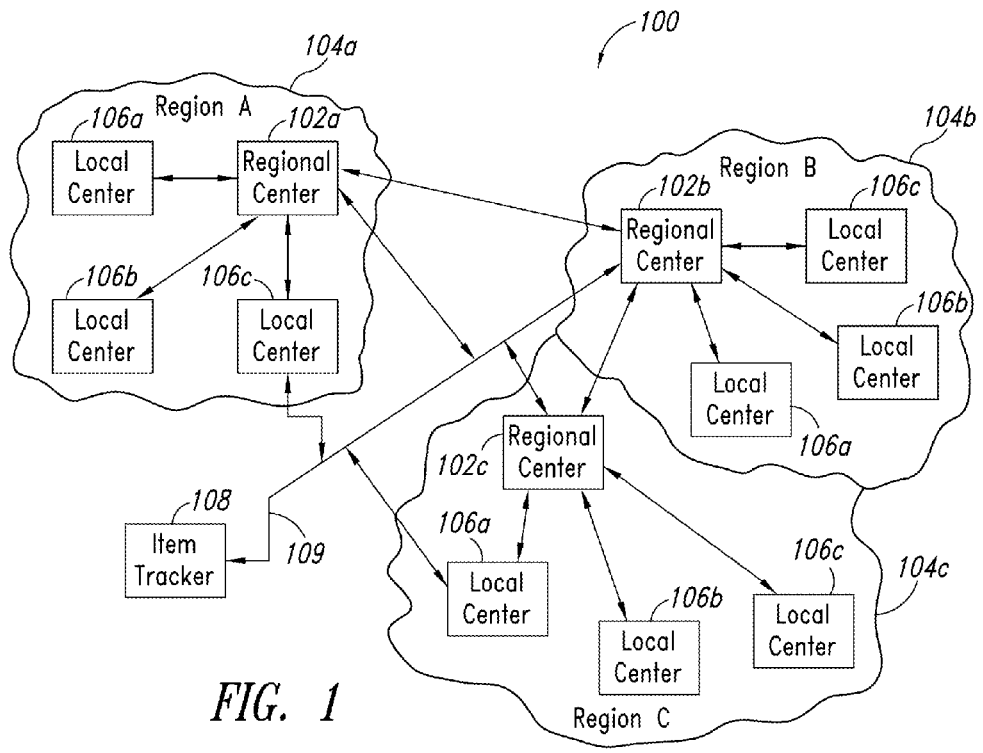
FIG. 1 is a block diagram of a delivery and stealth tracking system according to one non-limiting illustrated embodiment.

FIG. 1 shows a delivery and stealth tracking system 100 according to one non-limiting illustrated embodiment. For the sake of clarity, the delivery and stealth tracking system 100 is shown as a hub-and-spoke-type system. However, the principles disclosed herein are not limited to such a configuration.

The delivery and stealth tracking system 100 may include a number of regional centers, individually referenced as 102a-102c and collectively referenced as 102. The regional centers 102 form the "hubs" of the delivery and stealth tracking system 100. Each regional center 102 delivers and collects shipping items (not shown) within a respective geographical region, individually referenced as 104a-104c and collectively referenced as 104. The geographic regions 104 may be contiguously connected but do not have to be connected.

A number of local centers, collectively referenced as 106, may be associated with a respective one of the regional centers 102 and form the "spokes" of the hub-and-spoke system. Individually, respective local centers are referenced as 106(A)a-106(C)c, where the letter inside of the parenthesis denotes a respective region A, B, C. For example, the local centers 106(A)a-106(A)c of region 104a are associated with the regional center 102a. Among other things, the local centers 106 may provide customer service and allow a customer to drop-off a shipping item for delivery to a recipient and/or allow a recipient to pick up a shipping item.

A number of transportation vehicles (not shown) such as delivery trucks/vans may be associated with one of the local centers 106. The delivery trucks/vans may deliver and/or pick-up shipping items. For example, a delivery truck/van (not shown) of local center 106a of region 104a may deliver a shipping item from the local center 106a to a final destination. Additionally, the delivery truck/van may pick-up a shipping item from a customer's premises and take the shipping item to the local center 106a.

Delivery and pick up of shipping items (not shown) by the delivery and stealth tracking system 100 may involve consolidation of shipping items into loads of shipping items, distribution of loads of shipping items, and fragmentation of loads of shipping items. Consolidation may occur at multiple levels: customer level, local level, and regional level. At the customer level, individual shipping items may be collected by a driver of a transportation vehicle such as, but not limited to, a delivery truck or a van from one or more customers. At the local center level, shipping items may be consolidated into a load of shipping items for a respective regional center 102. At the regional center level, loads of shipping items from the local centers 106 may be further consolidated at respective regional centers 102. For example, loads of shipping items at local centers 106(C)a-106(C)c of geographical region 104c may be further consolidated at the regional center 102.

Loads of shipping items may be distributed within the shipping and tracking system 100 on a regional center 102 to regional center 102 basis. Various transportation vehicles such as, but not limited to, aircrafts, trucks, vans, trains, boats, barges, etc., may be used to move loads of shipping items between regional centers 102. In some situations, a shipping item and/or a load of shipping items may pass through two or more regional centers 102.

Fragmentation, which is the opposite of consolidation, may occur at the regional center level, the local center level, and the customer level. At the regional center level, a load of shipping items from one regional center 102 to another regional center 102 may be fragmented at the receiving regional center 102. The receiving regional center 102 may reconsolidate some of the shipping items in the received load of shipping items into a load of shipping items destined for another regional center 102 and/or may reconsolidate some of the shipping items in the received load of shipping items into a load of shipping items destined for a local center 106.

At the local center level, the local centers 106 receive loads of shipping items from their respective regional center 102 and fragment the loads of shipping items into transportation vehicles such as delivery truck/van loads. At the customer level, transportation vehicles such as delivery trucks/vans deliver individual shipping items to their respective destination address.

The delivery and stealth tracking system 100 may also include an item tracker 108. The item tracker 108 may be embodied in a computing system, distributed computing system, servers, etc. The item tracker 108 may be communicatively coupled to the regional centers 102 and/or the local centers 106 by a communication network 109. The communication network 109 may be a wireless network or a wired network or a combination of a wired and a wireless network. A wired network may include, but is not limited to, at least one physically tangible communications medium such as electrically conductive wire, coaxial cable, and/or optical medium such as fiber optical cable.

The regional centers 104 and the local centers 106 may include one or more tracking stations (not shown). Tracking stations may provide the item tracker 108 with information gathered at the respective tracking stations. The item tracker 108 may track a shipping item from an initial check-in location to a destination location as the shipping item moves through the delivery and stealth tracking system 100.

Alternatively, respective regional centers 104 and/or respective local centers 106 may include a respective item tracker subsystem (not shown), which receives information gathered at the respective tracking stations of the respective regional center 104 and/or respective local center 106. The respective item tracker subsystems (not shown) may process received information and provide the item tracker 108 with processed information indicative of the information gathered at the respective tracking stations.

The delivery and stealth tracking system 100 may provide different security levels for shipping items in the delivery and stealth tracking system 100. Typically, a sender or recipient of a shipping item will select a security level for the shipping item at the point of origin of the shipping item into the delivery and stealth tracking system 100. In some embodiments, the delivery and stealth tracking system 100 may transport shipping items having differing security levels through common transport paths. In other words, shipping items with a high level of security may be transported in the delivery and stealth tracking system 100 through the same transport paths that are used for shipping items with a lower level of security.

In some embodiments, the delivery and stealth tracking system 100 may transport shipping items having differing security levels through the delivery and stealth tracking system 100 in common loads. In other words, shipping items with a high level of security may be transported in the delivery and stealth tracking system 100 in the same load as shipping items with a lower level of security. For example, the local center 106a of region A may be the point of origin of two shipping items, one of which has a higher level of security than the other. Both of the shipping items may be transported from local center 106a to the regional center 102a of region A in the same load.

In some embodiments, the delivery and stealth tracking system 100 may hold shipping items having differing security levels in common areas. In other words, shipping items with a high level of security may be held in the delivery and stealth tracking system 100 in an area that also holds shipping items with a lower level of security. For example, two shipping items, one of which has a higher level of security than the other, may be held in the same portion of the regional center 102a of region A such as, for example, a sorting area.

In some embodiments, the delivery and stealth tracking system 100 may hold shipping items having differing security levels in different areas. In other words, shipping items with a high level of security may be held in the delivery and stealth tracking system 100 in a secure area separate from shipping items with a lower level of security.

In some embodiments, the delivery and stealth tracking system 100 may commingle shipping items having differing security levels. Shipping items with a higher security level may be transported and held with shipping items with a lower security level. There are advantages to commingling shipping items with differing security levels together. One advantage, among others, is that shipping items having a higher security level can be hidden in plain sight when they are commingled with shipping items having a lower security level. This is especially true, if the security level of a shipping item cannot be discerned based on the outward appearance of the shipping item. In some embodiments, transportation vehicles may include mobile tracking stations. Mobile tracking stations may be wirelessly communicatively to the item tracker 108. Mobile tracking stations may provide the item tracker 108 with information gathered at the respective mobile tracking stations. Alternatively, mobile tracking stations may be wirelessly communicatively coupled to one or more local centers 106 and/or to one or more regional centers 102. In that case, mobile tracking stations may provide gathered information to one or more local centers 106 and/or one or more regional centers 102, which may forward the information received from the mobile stations to the item tracker 108. In yet another embodiment, local centers 102 and/or regional centers 106 that receive information gathered by mobile stations may process the process received information and provide the item tracker 108 with processed information indicative of the information gathered at the respective mobile tracking stations.

In some embodiments, shipping items may be identified by a shipping item identifier, and the tracking stations may provide the item tracker 108 with, among other things, shipping item identifiers, raw data/information gathered from shipping items, and/or information indicative of processed data/information gathered from shipping items. The shipping item identifiers may be used by the item tracker 108 to, among other things, track shipping items.

In some embodiments, one or more items carried by a shipping item may be identified by a shipping item identifier. For example, a shipping item may be a package with a book therein, and in that case, the book is the item identified by the shipping item identifier. The tracking stations may provide the item tracker 108 with, among other things, shipping item identifiers, raw data/information gathered from shipping items and/or items, and/or information indicative of processed data/information gathered from shipping items. The shipping item identifiers may be used by the item tracker 108 to, among other things, items.

In some embodiments, the item tracker 108 may be communicatively coupled with delivery trucks/vans, and the delivery trucks/vans may include mobile tracking stations. The item tracker 108 may be communicatively coupled to wireless communications data reader devices carried by delivery personnel, and a respective wireless communications data reader device may be a part of a mobile tracking station.

Figure 2:
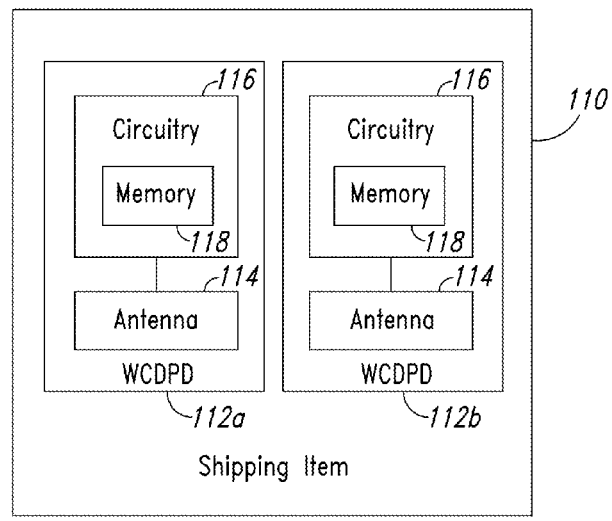
FIG. 2 is a block diagram of a shipping item for delivery by the delivery and stealth tracking system of FIG. 1 according to one non-limiting illustrated embodiment.

FIG. 2 shows a block diagram of a shipping item 110 according to one non-limiting illustrated embodiment. The shipping item 110 may carry two or more wireless communications data provider devices, individually referenced as 112a, 112b and collectively referenced as 112. In some embodiments, the wireless communications data provider devices 112 may be affixed to an outside surface of the shipping item 110. In some, the shipping item 110 may be a parcel, and the wireless communications data provider devices 112 may be affixed to an exterior surface of the parcel at the point of origin or close to the point of origin into the delivery and stealth tracking system 100, e.g., by the customer and/or by the delivery personnel who receives the parcel and/or by personnel at the receiving local center 106.

In some embodiments, the wireless communications data provider devices 112 may be affixed to an item (or items) carried by the shipping item 110. For example, where the shipping item 110 is a parcel, an item (not shown) within the parcel may carry the data provider devices 112. As another non-limiting example, where the shipping item 110 is a pallet, an item, or items, (not shown) carried by the pallet may carry the data provider devices 112.

The wireless communications data provider devices 112 may respond to interrogation by wireless communications data reader devices (not shown). In some embodiments, the wireless communications data provider devices 112 may be passive devices that are powered by electromagnetic energy wirelessly communicated to the wireless communications data provider devices 112. The electromagnetic energy may be emitted from a wireless communications data reader device or another device. In some embodiments, the wireless communications data provider devices 112 may be active devices having an internal power source such as a battery. For the sake of clarity, the wireless communications data provider devices 112 may be described below as passive devices, but the description as such is non-limiting. Radio frequency identification (RFID) devices are non-limiting examples of active and passive wireless communications data provider devices.

Each one of the wireless communications data provider devices 112 may include an antenna 114 and circuitry 116. The antenna 114 may couple with wireless emitted electromagnetic energy to provide power to the circuitry 116. Each one of the wireless communications data provider devices 112 has at least one respective inherent property such as a respective amount of impedance.

The circuitry 116 may include logic for responding to interrogation by wireless communications data reader devices and may include a memory 118. The memory 118 may store information and/or encode information indicative of an shipping item identifier. The circuitry 116 may include any circuitry that provides wireless communications in response to interrogation by a wireless communications data reader device. In response to an interrogation, the circuitry 116 may provide stored information such as information and/or the encoded information indicative of shipping item identifier to the wireless communications data reader. In some embodiments, the circuitry 116 may vary an amount of impedance so as to controllably backscatter electromagnetic energy received by the antenna 114.

The embodiment of the shipping item 110 has been illustrated and described as carrying two wireless communications data provider devices 112 for the sake of clarity. However, the shipping item 110 is not limited to carrying two wireless communications data provider devices 112. It is important to remember that the shipping item 110 may carry one or more wireless communications data provider device 112.

Figure 3A:
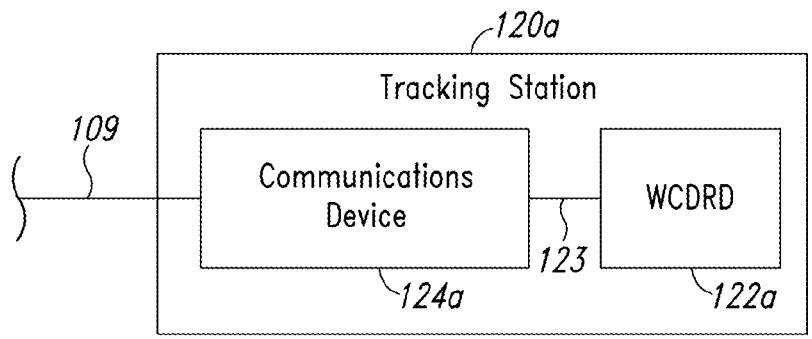
FIG. 3A is a block diagram of a tracking station according to one non-limiting illustrated embodiment.
Figure 3B:
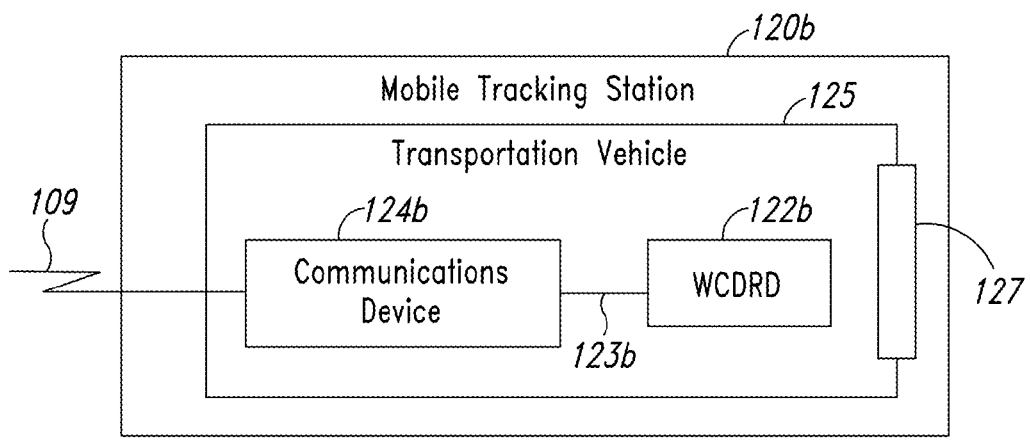
FIG. 3B is a block diagram of a mobile tracking station according to one non-limiting illustrated embodiment.

FIG. 3A shows a block diagram of a tracking station 120a according to one non-limiting illustrated embodiment, and FIG. 3B shows a block diagram of a tracking station 120b according to one non-limiting illustrated embodiment.

The tracking station 120a includes a wireless communications data reader device 122a and a communications device 124a, which are communicatively coupled by a communications link 123a to the communications network 109. The communications link 123a may be a physically tangible communications medium such an electrically conductive wire and/or an optical medium such as an optical cable/optical fiber. The communications link 123a may be a wireless communications link and/or a combination of a wireless communications link and physically tangible communications mediums. The wireless communications data reader device 122a may interrogate the wireless communications data provider devices 112a, 112b carried by a respective shipping item 110.

In some embodiments, the wireless communications data reader device 122a may be described below as a Radio frequency identification (RFID) reader, but the description as such is non-limiting. Similarly, wireless communications data reader devices 122b and 122c (see FIGS. 3B and 3C, respectively) may also be described below as a Radio frequency identification (RFID) reader, but the description as such is non-limiting.

During a full or complete interrogation of a wireless communications data provider device 112a, 112b, the wireless communications data provider device 112a, 112b may respond to a request from the wireless communications data reader device 122a by providing information such as information or encoded information indicative of a respective shipping item identifier to the wireless communications data reader device 122a. The wireless communications data reader device 122a may gather data indicative of a respective inherent property or inherent characteristic of a respective one of the wireless communications data provider devices 112a, 112b during an interrogation of the respective one of the wireless communications data provider devices 112a, 112b.

Naturally, the full interrogation might not happen instantaneously and may take a certain amount of time. In some embodiments, the wireless communications data reader device 122a may gather data indicative of a respective inherent property of a respective one of the wireless communications data provider devices 112a, 112b in a time period that is less than the time period for a full interrogation. For example, the wireless communications data reader device 122a may gather data related an amount of energy received from the wireless communications data provider device 112a, 112b such as an amount of energy (E) in a bit interval. The amount of energy received from the wireless communications data provider device 112a, 112b may be related to an inherent property of the wireless communications data provider device 112a, 112b such as an inherent amount of impedance of the wireless communications data provider device 112a.

Further, the wireless communications data reader device 122a may cease the interrogation of the wireless communications data provider device 112a, 112b once an amount of data is gathered and/or before completing a full interrogation. For example, if the wireless communications data provider device 112a, 112b is a passive device, the wireless communications data reader device 122a may cease providing electromagnetic energy that powers the wireless communications data provider device 112a, 112b after having gathered an amount of data. Thus, the data may be gathered without the wireless communications data provider device 112a, 112b providing the requested information.

As another nonlimiting example, even when the wireless communications data provider device 112a, 112b is not being interrogated, the wireless communications data provider device 112a, 112b may emit and/or backscatter electromagnetic energy. The emitted and/or backscattered electromagnetic energy may be in response to the wireless communications data provider device 112a, 112b receiving electromagnetic energy, where the electromagnetic energy received by the wireless communications data provider device 112a, 112b is separate from an interrogation of the wireless communications data provider device 112a, 112b.

As another nonlimiting example, there may be various protocols for an interrogation. The wireless communications data reader device 122a may gather the data without following the interrogation protocols. In other words, the wireless communications data reader device 122a may be able to gather the data without "interrogating" the wireless communications data provider device 112a, 112b.

The communications device 124a is communicatively coupled to the wireless communications data reader device 122a via communications link 123. The communications device 124a may include a network device for communicating with the item tracker 108 over the communications network 109, which may be a wire network or a wireless network or a combination of both.

There may be multiple tracking stations 120a, which are collectively referenced as 120, at any given location. For example, a regional center 102 may have a sorting room where shipping items are sorted into loads for various other regional centers. There may be a first tracking station 120 that wirelessly gathers data from the wireless communications data provider device 112a, 112b and/or interrogates the wireless communications data provider device 112a, 112b of a shipping item 110 before the shipping item 110 is sorted into a load of shipping items and a second tracking station 120 that wirelessly gathers data from the wireless communications data provider device 112a, 112b and/or interrogates the wireless communications data provider device 112a, 112b of the shipping item 110 after the shipping item 110 is sorted into a load of shipping items.

FIG. 3B shows a block diagram of a mobile tracking station 120b according to one non-limiting illustrated embodiment. In FIG. 3B, the various labels having both a reference numeral and a letter "b" that identify components and/or features that are similar in at least some respects as those shown in FIG. 3A that are labeled with the same reference numeral and the letter "a." The detailed description of such components are initially provided with respect to the embodiment of FIG. 3A and, for the sake of brevity, the description of such components in the context of their subsequent "b" labeled counterparts in FIG. 3B are abbreviated or omitted.

The tracking station 120b includes a wireless communications data reader device 112b and a communications device 124b, which are communicatively coupled by a communications link 123b. The communications link 123b may be a physically tangible communications medium such an electrically conductive wire and/or an optical medium such as an optical cable/optical fiber. The communications link 123b may be a wireless communications link and/or a combination of a wireless communications link and physically tangible communications mediums. The wireless communications data reader device 122b may interrogate the wireless communications data provider devices 112a, 112b carried by a respective shipping item 110.

The mobile tracking station 120b may be carried by a transportation vehicle 125. The wireless communications data reader device 122b may be positioned relative to a shipping item ingress/egress portion 127 of the transportation vehicle 125 such as a cargo door of a delivery van. The wireless communications data reader device 122b may automatically interrogate/gather information from the respective wireless communications data provider devices 112 of shipping items 110 as the respective shipping items 110 pass through the shipping item ingress/egress portion 127 of the transportation vehicle 125. The wireless communications data reader device 122b may be manually actuated to interrogate/gather information from the respective wireless communications data provider devices 112 of shipping items 110.

The communications device 124b receives information gathered by the wireless communications data reader device 122b. The communications device 124b may wirelessly provide the gathered information to one or more local centers 106 and/or one or more regional centers 102 and/or to the item tracker 108.

Figure 3C:
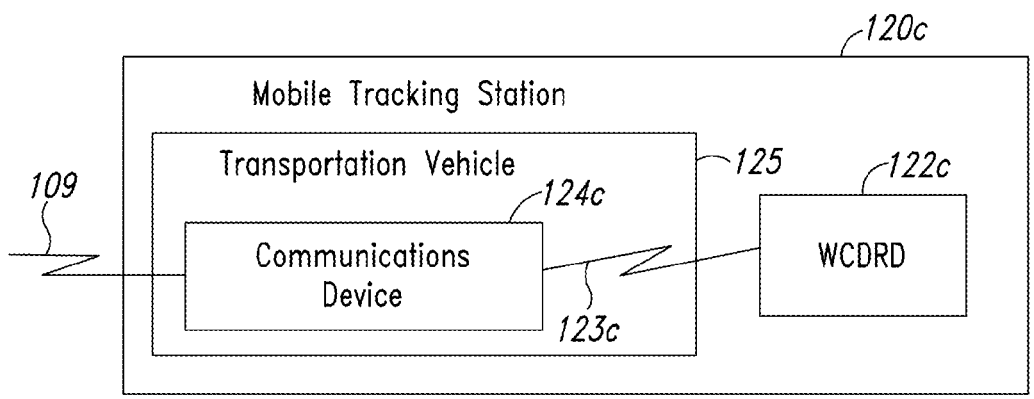
FIG. 3C is a block diagram of a mobile tracking station according to one non-limiting illustrated embodiment.

FIG. 3C shows a block diagram of a mobile tracking station 120c according to one non-limiting illustrated embodiment. The tracking station 120c includes a handheld wireless communications data reader device 122c and a communications device 124c, which are communicatively coupled by a communications link 123c. The communications link 123c may be a physically tangible communications medium such an electrically conductive wire and/or an optical medium such as an optical cable/optical fiber that is detachable from the handheld wireless communications data reader device 122c. The communications link 123c may be a wireless communications link and/or a combination of a wireless communications link and physically tangible communications mediums.

The handheld wireless communications data reader device 122c may be used by personnel of the delivery and stealth tracking system 100 to interrogate/gather information from the wireless communications data provider devices 112 of a shipping item 110 while the shipping item 110 is loaded onto or unloaded from the transportation vehicle 125c. The handheld wireless communications data reader device 122c may wirelessly provide the communications device 124c with information including information gathered during interrogation and gathered data while the handheld wireless communications data reader device 122c gathers the information.

Additionally, the handheld wireless communications data reader device 122c may store gathered information including information gathered during interrogation and gathered data. In that case, the handheld wireless communications data reader device 122c may be used by personnel of the delivery and stealth tracking system 100 to interrogate/gather data from the wireless communications data provider devices 112 of a shipping item 110 even when the handheld wireless communications data reader device 122c is not communicatively coupled to communications device 124c. After a communications link between the handheld wireless communications data reader device 122c and the communications device 124c is established, the stored information may be provided to the communications device 124c. Thus, a delivery person may take a handheld wireless communications data reader device 122c away from a communications device 124c and use the handheld wireless communications data reader device 122c at a customer's premises to check-in or check-out a shipping item 110.

In some embodiments, the handheld wireless communications data reader device 122c may be placed in a cradle (not shown). The cradle may provide the communications link 123c between the handheld wireless communications data reader device 122c and the communications device 124c.

The communications device 124c receives information gathered by the wireless communications data reader device 122c. The communications device 124c may wirelessly provide the gathered information to one or more local centers 106 and/or one or more regional centers 102 and/or to the item tracker 108.

In some embodiments, the communications device 124c may also be portable and may be carried by personnel of the delivery and stealth tracking system 100. In that case, the handheld wireless communications data reader device 122c and the communications device 124c may be communicatively coupled no matter the location of the person carrying the communications device 124c and the handheld wireless communications data reader device 122.

It is important to remember that the shipping item 110 may carry one, two or more wireless communications data provider devices 112. Thus, the wireless communications data reader devices 122a, 122b, 122c may gather data indicative of a respective inherent property or inherent characteristic of a respective wireless communications data provider device for each wireless communications data provider device 112 carried by the shipping item 110. Alternatively, the wireless communications data reader devices 122a, 122b, 122c may gather data indicative of a respective inherent property or inherent characteristic of a respective wireless communications data provider device for each of a predetermined number of the wireless communications data provider device(s) 112 carried by the shipping item 110. Similarly, the wireless communications data reader devices 122a, 122b, 122c may perform a full interrogation or a partial interrogation of each respective wireless communications data provider device 112 carried by the shipping item 110 or a predetermined number of the wireless communications data provider device(s) 112 carried by the shipping item 110.

Figure 4:
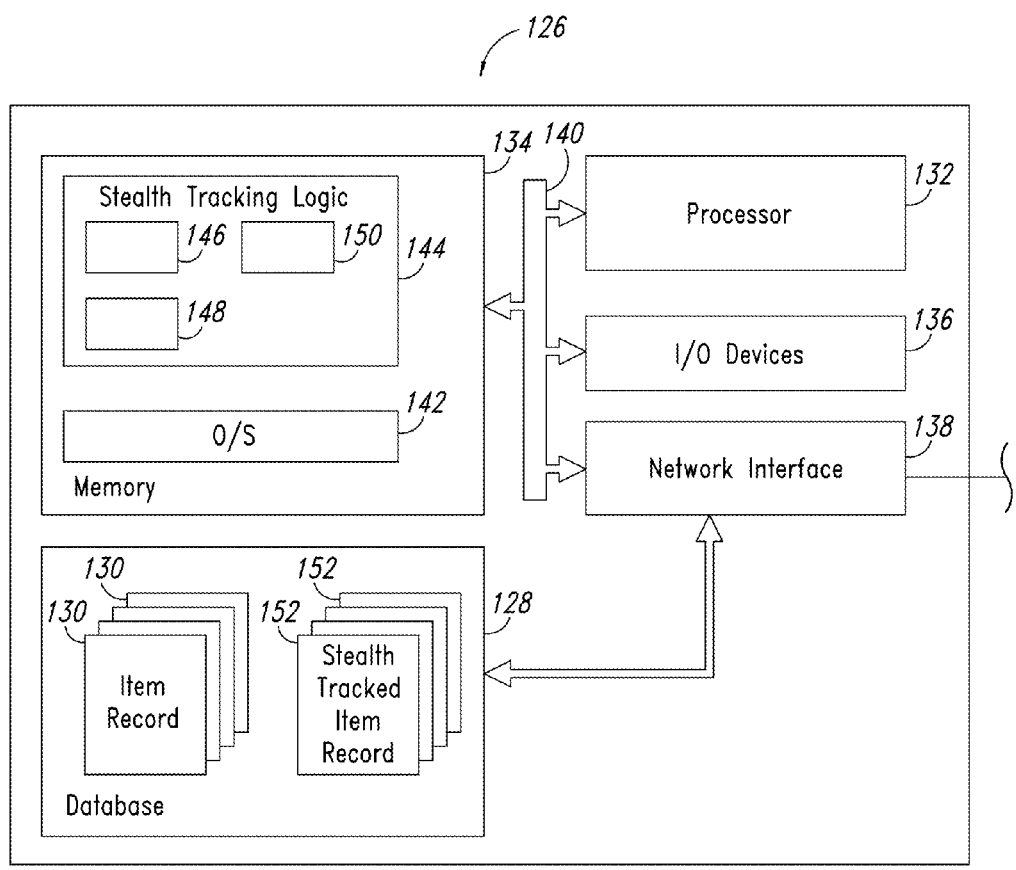
FIG. 4 is a block diagram of an item tracker according to one non-limiting illustrated embodiment.

FIG. 4 shows a block diagram of an item tracker 108 according to one non-limiting illustrated embodiment. In the embodiment shown in FIG. 4, the item tracker 108 includes a tracker subsystem 126 communicatively coupled to a database 128 via communications link 129. Among other things, the database 128 may include a number of shipping item records 130. A respective one of the shipping item records 130 may be logically associated with a respective shipping item 110 via a respective shipping item identifier.

Typically, when a shipping item 110 enters the delivery and stealth tracking system 100, a shipping item record 130 is created for the shipping item 100 and logically associated therewith. Among other things, a shipping item record 130 may include: a delivery path and a delivery schedule. The delivery path may include an initial check-in location and a final destination location and may further include respective locations of one or more tracking stations 120. The delivery schedule may include a check-in time and an estimated time of arrival at the final destination. The delivery schedule may further include station check-in times and station check-out times, and may further include at least one station estimated time of arrival. The shipping item 110 has at least one wireless communications data provider device 112, which is read by a wireless communications data reader device 122, when the shipping item 110 is initially "checked-in" to the delivery and stealth tracking system 100. The shipping item record 130 for the shipping item may be logically associated with the shipping item via information related to or indicative of the shipping item identifier read from the wireless communications data reader device 122. Based at least on information or encoded information indicative of a respective shipping item identifier that is gathered during an interrogation of one or more of the wireless communications data provider devices 112 of a respective shipping item 110, the tracker subsystem 126 may determine which particular shipping item record 130 is associated with the respective shipping item 110.

The tracker subsystem 126 may create or update the shipping item record 130 for a particular shipping item 110 based at least on information received from various tracking stations 120. As the particular shipping item 110 travels along its delivery path toward its final destination, the tracker subsystem 126 may update the shipping item record 130 logically associated with the particular shipping item 110 based at least on information received from tracking stations 120 that have gathered information from the one or more wireless communications data provider devices 112 of the particular shipping item 110.

The database 128 may include a respective stealth tracked shipping item record 152 for selected shipping items 110. When a shipping item 110 is initially checked-in to the delivery and stealth tracking system 100, the customer may select/request to have a high security level or enhanced tracking of the customer's shipping item 110. In that case, a respective stealth tracked shipping item record 152 may be created and associated with the customer's shipping item 110, and the shipping item 110 will carry at least two wireless communications data provider devices 112. The stealth tracked shipping item 152 may include, among other things, a reference joint item-device configuration value. The reference joint item-device configuration value may be determined at an initial check-in of the shipping item 110 into the delivery and stealth tracking system 100. In some embodiments, a shipping item record 130 for a selected shipping item 110 may include the stealth tracked shipping item record 152 for the selected shipping item 110.

The tracker subsystem 126 may selectively provide and/or deny access to information indicative of the security information such as stealth tracked shipping item records 152. For example, some personnel of the delivery and stealth tracking system 100 may be logically authorized to access some information such as information related to the delivery path and/or delivery schedule for a particular shipping item 110. Additionally, some personnel of the delivery and stealth tracking system 100 may be logically authorized to access information indicative of security information such as stealth tracked shipping item records 152. Some of the personnel who are authorized to access information related to the delivery path and/or delivery schedule for a particular shipping item 110 might not be logically authorized to access information indicative of security information for the particular shipping item 110. Those persons who are not logically authorized to access information indicative of security information cannot determine which shipping item records 130 include security information such as stealth tracked shipping item records 152 and which do not.

The tracker subsystem 126 includes a processor 132, a memory 134, input/output devices 136, and network interface device 138, which are communicatively coupled by one or more buses 140.

The processor 132 may be a device for executing software, particularly that stored in the memory 134. The processor 132 may be a custom made or commercially available processor, a central processing unit (CPU), a semiconductor based microprocessor (in the form of a microchip or chip set), or generally any device for executing software instructions.

The memory 134 is communicatively coupled to the processor 132. The memory 134 may include any one or a combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

The memory 134 may store one or more logic modules or logic routines, each of which may comprise an ordered listing of executable instructions for implementing logical functions. In particular, the memory 134 includes an operating system 142 and stealth tracking logic 144. The execution of the operating system 142 by the processor 132 essentially controls the execution of other logic, such as stealth tracking logic 144, and provides scheduling, input-output control, file and data management, memory management, and communication control and related services.

The stealth tracking logic 144 may include various logic modules or logic routines, each of which may comprise an ordered listing of executable instructions for implementing logical functions. In particular, the stealth tracking logic 144 may include shipping/routing logic 146, joint item-device characterizer logic 148, and monitoring logic 150. The stealth tracking logic 144 may also include logic for creating and updating of shipping item records 130 and stealth tracked shipping item records 152. Among other things, the stealth tracking logic 144 may include logic to selectively provide and/or deny access to information indicative of security information. By selectively providing and/or denying access to information indicative of security information, the stealth tracking logic 144 may prevent unauthorized personnel from determining which, if any, shipping items are subject to enhanced protection. Among other things, security information logically associated with a shipping item may include the reference joint item-device configuration value.

The shipping/routing logic 146 includes logic for determining routes for shipping items. Among other things, the shipping/routing logic 146 may determine which tracking stations 120 are in the path of a respective shipping item and/or may determine an estimated time of arrival of the respective shipping item at one or more of the tracking stations 120 in the path of the respective shipping item.

Among other things, the joint item-device characterizer 148 may include logic for determining joint item-device configuration values of the respective shipping item and the wireless communications data provider devices 112 based at least on information/data gathered at item shipping stations 120. The determined joint item-device configuration value(s) may be indicative of an inherent joint property of the shipping item 110 and the wireless communications data provider devices 112 carried thereby. For example, the joint item-device configuration value may depend on a determined inherent constant of the wireless communications data provider devices and may also depend on the relative locations of the wireless communications data provider devices with respect to each other. As another example, the joint item-device configuration value may depend on the specific wireless communications data provider devices. So if any one of the wireless communications data provider devices carried by a shipping item are changed or altered or moved, then afterwards, the current determined joint item-device configuration value will differ from a previous or reference joint item-device configuration value.

The joint item-device characterizer 148 may include logic for storing a reference joint item-device configuration value and associating the stored reference value with the respective shipping item. The reference joint item-device configuration value of a respective shipping item 110 may be determined based at least on information gathered by an initial tracking station. The joint item-device characterizer 148 may include logic for comparing a current value of a determined joint item-device configuration value of a respective shipping item against the reference joint item-device configuration value of the respective shipping item. A deviation between the joint item-device configuration value and the reference joint item-device configuration value may indicate tampering of the shipping item.

In some embodiments, the joint item-device characterizer 148 may include various statistical modules. The joint item-device characterizer 148 may include logic for analyzing data/information gathered at the tracking stations 120. As one non-limiting example, the joint item-device characterizer 148 may determine a joint item-device configuration value of a respective shipping item such as a ratio between a respective amount of energy from each wireless communications data provider devices 112a, 112b received at a respective wireless communications data reader device 122b over a given interval of time such as a bit interval. For example, $E_{a,n}$ and $E_{b,n}$ may be the amount of energy per bit interval received from wireless communications data provider devices 112a, 112b, respectively, by a wireless communications data reader device 122 of a $n^{th}$ tracking station 120. If $N_0$ represents an amount of noise power per bit interval, then reader sensitivity for wireless communications data provider devices 112a, 112b is given by $S_{a,n}=E_{a,n}/N_0$ and $S_{b,n}=E_{b,n}/N_0$, respectively. An inherent constant determined by the item characterizer logic 148 may then be given as $I_n=S_{a,n}/S_{b,n}$. In this example, the inherent constant is related to the respective impedances of wireless communications data provider devices 112a, 112b. In other instances, different quantities, which are related to a different inherent property, may be measured, and different inherent constants may be determined.

The monitoring logic 150 may include logic for determining estimated times of arrivals of shipping items at various tracking stations 120 and for initiating notification procedures such as providing a tracking-alarm when shipping items are overdue at one or more of the tracking stations 120. The monitoring logic 150 may also include logic for determining estimated times of departure of shipping items from various tracking stations 120 and for initiating notification procedures when shipping items are overdue for departure from one or more of the tracking stations 120. The monitoring logic 150 may initiate notification procedures when there is a deviation between a current inherent constant and a reference inherent constant for a respective shipping item.

The I/O devices 136 may include user interface devices such as a display and various user input devices such as keyboards, mice, buttons, keys, track wheel, track ball, joy stick, key pad, number pad, touch pad, touch screen, user selectable icons, etc.

The network interface 138 may include network cards and/or wireless communication devices that provide a communication link with the tracking stations 120.

The tracker subsystem 126 may be implemented in hardware, as in an alternative embodiment, and the tracker subsystem 126 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
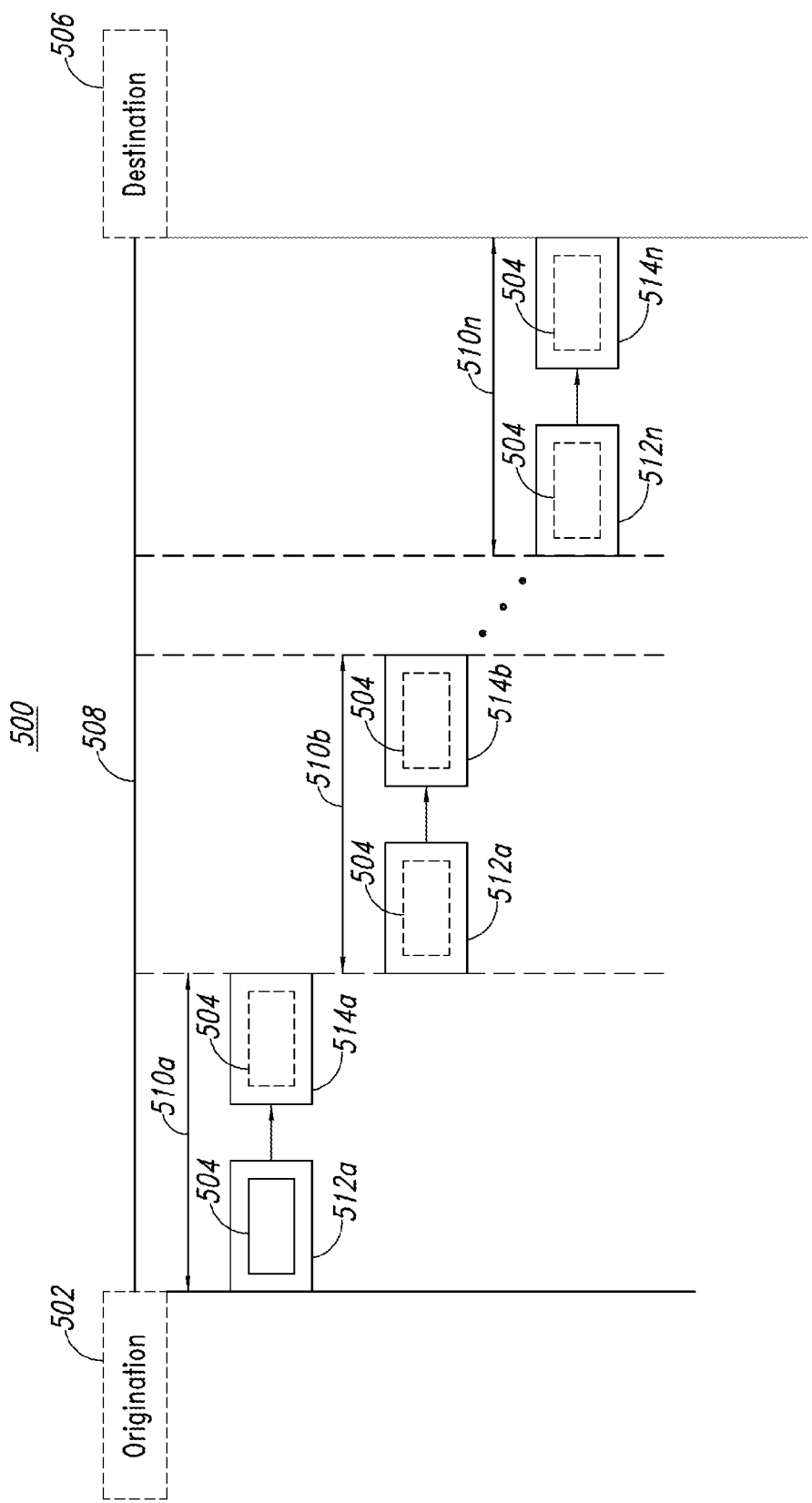
FIG. 5 is a flow diagram of a process for delivering an item according to one non-limiting illustrated embodiment.

FIG. 5 shows a flow diagram of a process 500 for delivering a shipping item according to one non-limiting illustrated embodiment. Certain acts in the processes or process flow described in all of the logic flow diagrams referred to below must naturally precede others to function as described. However, the various embodiments are not limited to the order of the acts described if such order or sequence does not alter the functionality of one or more of the embodiments. That is, it is recognized that some acts may be performed before, after, or in parallel with other acts. Further, some embodiments, may include additional acts and/or omit other acts.

At an origination point 502, a shipping item 504 is introduced into the delivery and stealth tracking system 100. The origination point 502 may be a drop-off box, a pickup at a customer's premises by a delivery person, or at a local center 106. The shipping item 504 may be routed from the origination point 502 to a destination point 506 along a delivery/processing path 508 or a custodial path that includes multiple stages, which are individually referenced as 510a-510n and collectively referenced as 510. Each stage 510 may be conceptualized as a link in a chain of custody of the shipping item 504 that extends from the origination point 502 to the destination point 506. At each stage 510, a portion of the delivery and stealth tracking system 100 has responsibility for the shipping item 504 and may have physical possession of the shipping item 504. The shipping item 504 includes the wireless communications data provider devices 112. In some embodiments, the wireless communications data provider devices 112 may be included with the shipping item 504 prior to the point of origination 502. For example, a customer may affix the wireless communications data provider devices 112 to the shipping item 504.

In some embodiments, the wireless communications data provider devices 112 may be provided to the shipping item 504 at, or after, the point of origination 502. For example, an agent or representative or personnel of the delivery and stealth tracking system 100 may affix the wireless communications data provider devices 112 to the shipping item 504 at the point of origination 502, where the point of origination 502 coincides with the stage 510a. Alternatively, the point of origination 502 may be a drop-off box, and an agent or representative or personnel of the delivery and stealth tracking system 100 may affix the wireless communications data provider devices 112 to the shipping item 504 at stage 510a.

Each one of the stages 510 may include at least one tracking station 120. The shipping item 504 may be checked-in, individually referenced as 512a-512n and collectively referenced as 512, and checked-out, individually referenced as 514a-514n and collectively referenced as 514, at each of the stages 510 based at least in part on information gathered by the tracking stations 120 or tracking station 120 of the respective stage 510.

Typically, at least one wireless communications data provider device (not shown) that is carried by shipping item 504 is read or interrogated by wireless communications data reader device (not shown) when the shipping item 504 is checked-in/checked-out so as to acquire/gather information indicative of an item identifier associated with the shipping item 504. The information indicative of an item identifier may transmitted to the item tracker 108.

In addition, information indicative of a joint item-device configuration value may be gathered for shipping items that have a threshold security level or higher and/or enhanced tracking each time such shipping items are checked-in or checked-out. However, information indicative of a joint item-device configuration value may also be gathered at other times besides when a shipping item is checked-in or checked-out.

Each respective stage 510 happens over a respective period of time. The period of time commencing when the shipping item 504 is checked-in 512 at a respective stage 510 and ending when the shipping item 504 is checked-out 514 at the respective stage 510. Additionally, some stages may happen over different geographical locations. For example, the stage 510b may cover the shipping item 504 being transported from a local center 106 to a regional center 102, e.g., the shipping item 504 may be checked-in 512b at stage 510b when the shipping item 504 is loaded on a transportation vehicle or exits the local center 106 and may be checked-out 514b at stage 510b when the shipping item 504 is unloaded from the transportation vehicle or enters the regional center 102.

In some embodiments, a change of possession may happen whenever the shipping item 504 changes location such as, for example, from a receiving area of a respective local center 106 or a receiving area of a respective regional center 102 to a sorting area of the respective local center 106 or a sorting area of the respective regional center 102.

In some embodiments, some or all of the stages 510 of the delivery/process path 508 may be essentially continuous. As the shipping item 504 is checked-out 514 of one of the stages 510, the shipping item 504 may be checked-in 512 to the next one of the next stages 510.

The tracking station 120 of a respective stage 510 gathers information from the wireless communications data provider devices 112 of the shipping item 504 when the shipping item 504 is checked-in 512 at the respective stage 510 and when the shipping item 504 is checked-out 514 at the respective stage 510. For example, a transportation vehicle 125 may have a mobile tracking station 120b at an egress/ingress point 127 of the transportation vehicle 125. The mobile tracking station 120b may automatically gather information from the shipping item 504 when the shipping item 504 is loaded onto and unloaded from the transportation vehicle 125.

In some embodiments, the shipping item 504 may pass through multiple stages 510 as the shipping item 504 is processed through a facility such as a local center 106 or regional center 104. For example, a sorting room may have multiple points of ingress and egress, and some or all of the points of ingress and egress may have a respective tracking station. A first tracking station may automatically gather information from the shipping item 504 when the shipping item 504 enters the sorting room, and a second tracking station may automatically gather information from the shipping item 504 when the shipping item 504 exits the sorting room. The shipping item 504 is automatically "checked-in" to the sorting room by the tracker subsystem 126 based at least on information gathered by the first tracking station and is automatically "checked-out" of the sorting room based at least on information gathered by the second tracking station. The shipping item 504 may be automatically checked-in with another portion of the delivery and stealth tracking system 100 based at least on information gathered by the second tracking station.

At stage 510a, the shipping item 504 is initially checked-in 512a with the delivery and stealth tracking system 100. In some embodiments or situations, stage 510a may coincide with the point of origination 502. For example, if a customer brings the shipping item 504 to a local center 106, the local center 106 may be the point of origination 502 and the point of initial check-in 512a. The shipping item 504 may be initially checked-in by personnel receiving the shipping item 504 from the customer. In some embodiments, the point of origination 502 and stage 510a may coincide with a pick-up point. For example, when the shipping item 504 is picked up at a customer's premises or other location by an agent or representative or personnel of the delivery and stealth tracking system 100, the agent or representative or personnel of the delivery and stealth tracking system 100 may take possession of the shipping item 504 and check-in 512a the shipping item 504, via a mobile tracking station 120b, 120c.

Alternatively, in some embodiments or situations, the shipping item 504 may be initially checked-in 512a after the delivery and stealth tracking system 100 takes possession of the shipping item 504. For example, when a customer deposits the shipping item 504 in a drop-off box of the delivery and stealth tracking system 100, the drop-off box may then be regarded as the origination point 502, and the shipping item 504 may be checked-in 512a by an agent or representative or personnel of the delivery and stealth tracking system 100 using a mobile tracking station 120b, 120c at the drop-off box, or by a tracking station 120 at a local center 106 or at a regional center 102.

Some time after checked-in 512a at stage 510a, the shipping item 504 is checked-out 514a and proceeds along the delivery/processing path 508 to stage 510b. As the shipping item 504 proceeds along the delivery/processing path 508 toward the destination 506, the shipping item 504 is checked-in 512 and checked-out 514 of each intervening stage 510.

At stage 510n, the shipping item 504 is checked-out 514n at the destination 506.

Figure 6:
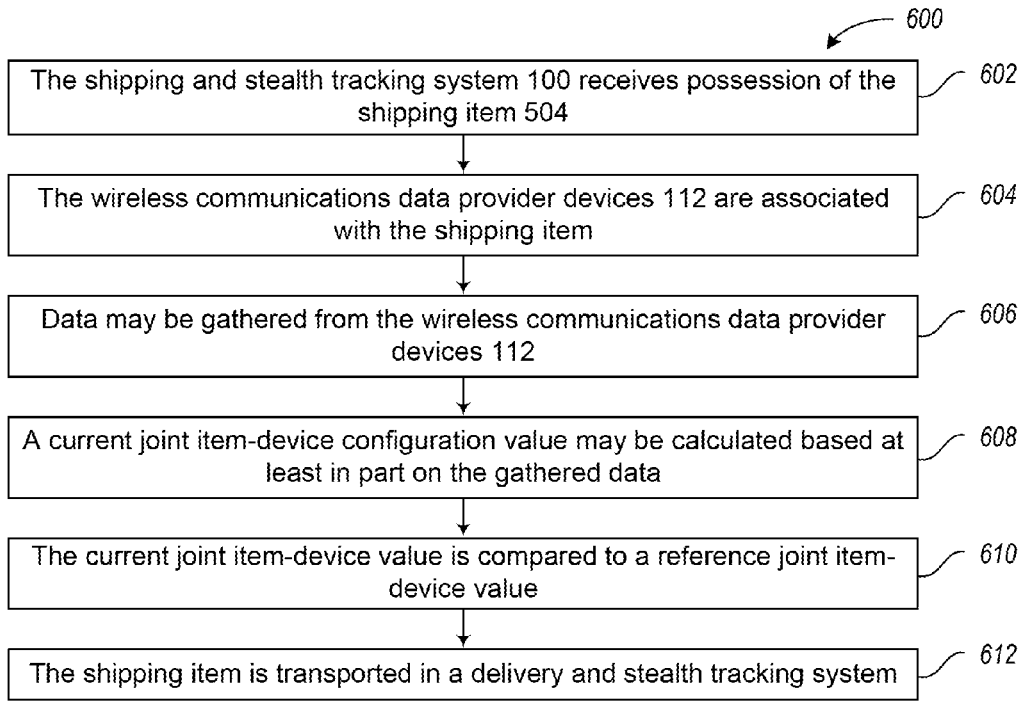
FIG. 6 is a flow diagram of a process to operate a delivery and stealth tracking system according to another non-limiting illustrated embodiment.

FIG. 6 is a flow diagram of a process 600 for operating the delivery and stealth tracking system 100 according to one non-limiting illustrated embodiment.

At 602, the shipping and stealth tracking system 100 receives possession of the shipping item 110.

At 604, the wireless communications data provider devices 112 are associated with the shipping item 110. The association may be physical such as affixing the wireless communications data provider devices 112 to the shipping item 110 and/or by affixing the wireless communications data provider devices 112 to a container and/or pallet carrying the shipping item 110. The association may additionally be logical, for example, where an identifier is logically associated with specific information about a shipping item (e.g., make, type, serial number, etc.).

At 606, data may be gathered from the wireless communications data provider devices 112. As a non-limiting example, the gathered data may include an indication of an amount of energy ($E_a$, $E_b$) in a bit interval for each of the wireless communications data provider devices 112a, 112b, respectively. The wirelessly gathered information may be indicative of an inherent property of the first and the second wireless communications data provider devices physically coupled to the shipping item and may be gathered with a wireless communications data reader device.

At 608, a current joint item-device configuration value may be determined based at least in part on the gathered data. In some embodiments, the current joint item-device configuration value may be a joint data-provider characteristic. For example, in some embodiments, the gathered data may include an indication of an amount of energy ($E_a$, $E_b$) in a bit interval for each of the wireless communications data provider devices 112a, 112b, respectively.

At 610, the current joint item-device configuration value may be compared to a reference joint item-device configuration value. The reference joint item-device configuration value may have been determined at any time between the current time and when the wireless communications data provider devices 112 were associated with the shipping item 110.

At 612, the shipping item 504 is transported from a first point in the delivery and stealth tracking system to a second point in the delivery and stealth tracking system.

Figure 7:
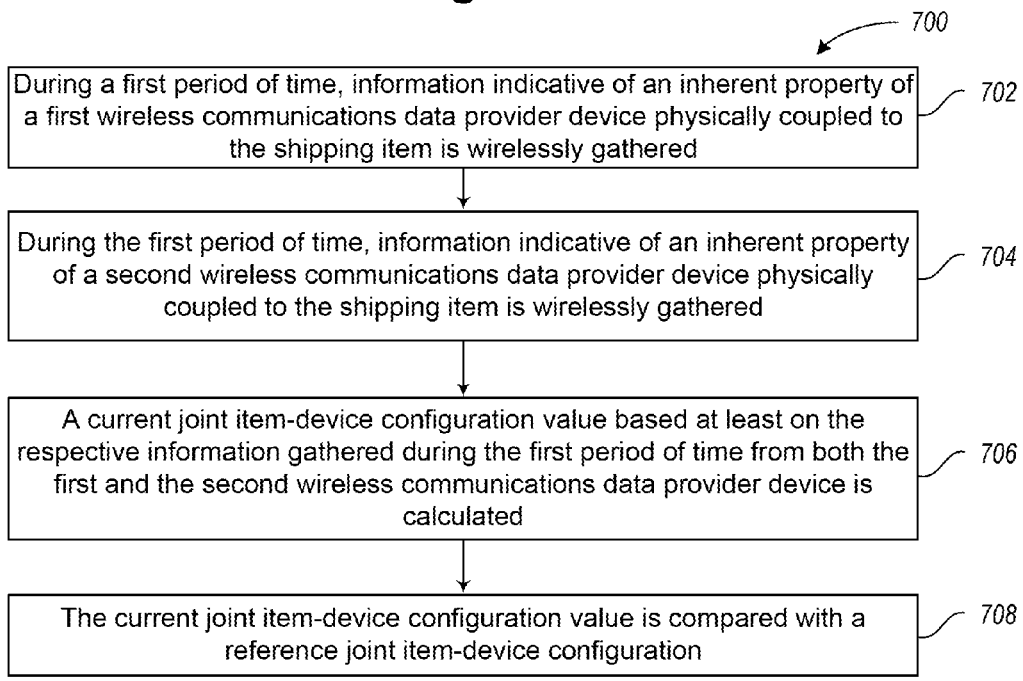
FIG. 7 is a flow diagram of a process to operate a delivery and stealth tracking system according to another non-limiting illustrated embodiment.

FIG. 7 is a flow diagram of a process 700 of operating a delivery and stealth tracking system according to one non-limiting illustrated embodiment.

At 702, during a first period of time, information indicative of an inherent property of a first wireless communications data provider device physically coupled to the shipping item is wirelessly gathered.

At 704, during the first period of time, information indicative of an inherent property of a second wireless communications data provider device physically coupled to the shipping item is wirelessly gathered.

At 706, a current joint item-device configuration value based at least on the respective information gathered during the first period of time from both the first and the second wireless communications data provider device is calculated.

At 708, the current joint item-device configuration value is compared with a reference joint item-device configuration, wherein the reference joint item-device configuration value was previously calculated based at least on respective information previously gathered during a second period of time preceding the first period of time from both the first and the second wireless communications data provider device.

Figure 8:
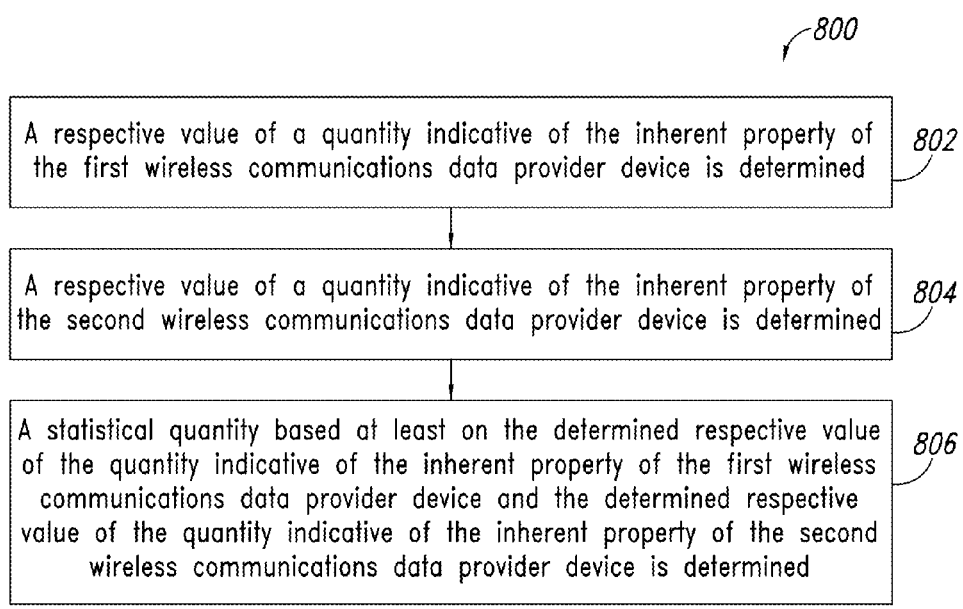
FIG. 8 is a flow diagram of a process of operate a delivery and stealth tracking system according to one non-limiting illustrated embodiment.

FIG. 8 is a flow diagram of a process 800 of operating a delivery and stealth tracking system according to one non-limiting illustrated embodiment. The process 800 may include some or all of the process 700 of FIG. 7.

At 802, a respective value of a quantity indicative of the inherent property of the first wireless communications data provider device is determined.

At 804, a respective value of a quantity indicative of the inherent property of the second wireless communications data provider device is determined.

At 806, a statistical quantity based at least on the determined respective value of the quantity indicative of the inherent property of the first wireless communications data provider device and the determined respective value of the quantity indicative of the inherent property of the second wireless communications data provider device is determined.

Figure 9:
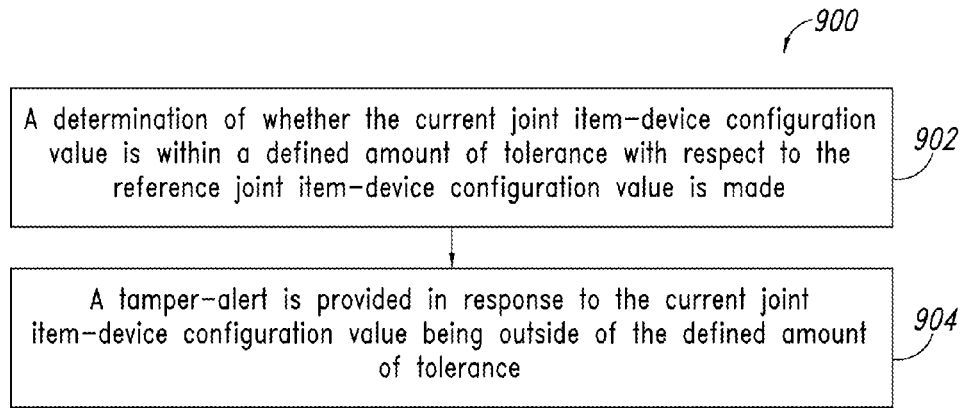
FIG. 9 is a flow diagram of a process of operate a delivery and stealth tracking system according to one non-limiting illustrated embodiment.

FIG. 9 is a flow diagram of a process 900 of operating a delivery and stealth tracking system according to one non-limiting illustrated embodiment. The process 900 may include some or all of the process 700 of FIG. 7.

At 902, a determination of whether the current joint item-device configuration value is within a defined amount of tolerance with respect to the reference joint item-device configuration value is made. The determination is based at least on the comparison of the current joint item-device configuration value with the reference joint item-device configuration value.

At 904, a tamper-alert is provided in response to the current joint item-device configuration value being outside of the defined amount of tolerance.

Figure 10:
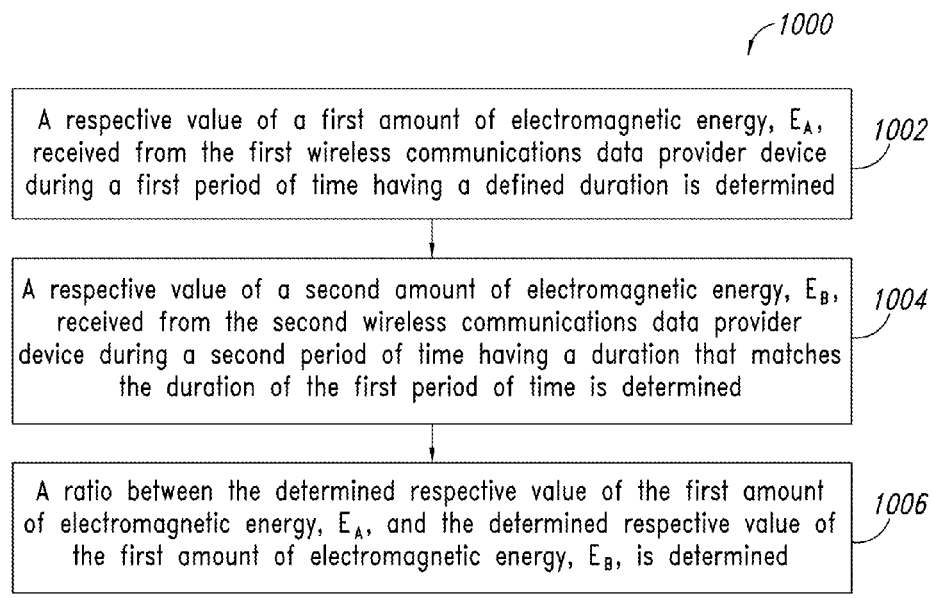
FIG. 10 is a flow diagram of a process of operate a delivery and stealth tracking system according to one non-limiting illustrated embodiment.

FIG. 10 is a flow diagram of a process 1000 of operating a delivery and stealth tracking system according to one non-limiting illustrated embodiment. The process 1000 may include some or all of the process 900 of FIG. 9.

At 1002, a respective value of a first amount of electromagnetic energy, $E_a$, received from the first wireless communications data provider device during a first period of time having a defined duration is determined.

At 1004, a respective value of a second amount of electromagnetic energy, $E_b$, received from the second wireless communications data provider device during a second period of time having a duration that matches the duration of the first period of time is determined.

At 1006, a ratio between the determined respective value of the first amount of electromagnetic energy, $E_a$, and the determined respective value of the first amount of electromagnetic energy, $E_b$, is determined.

Figure 11:
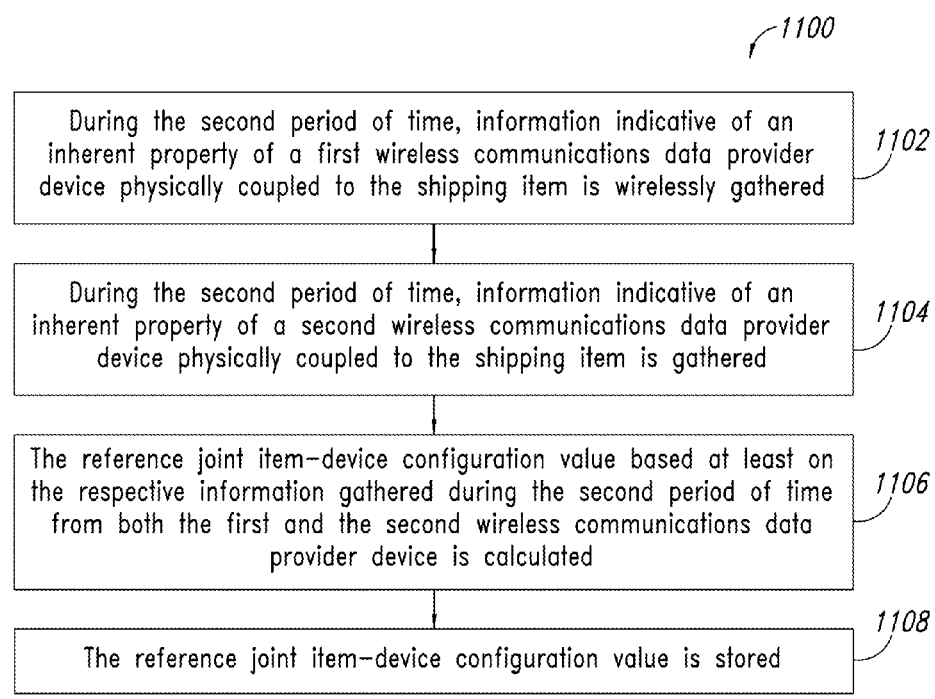
FIG. 11 is a flow diagram of a process of operate a delivery and stealth tracking system according to one non-limiting illustrated embodiment.

FIG. 11 is a flow diagram of a process 1100 of operating a delivery and stealth tracking system according to one non-limiting illustrated embodiment. The process 1100 may include some or all of the process 700.

At 1102, during the second period of time, information indicative of an inherent property of a first wireless communications data provider device physically coupled to the shipping item is wirelessly gathered.

At 1104, during the second period of time, information indicative of an inherent property of a second wireless communications data provider device physically coupled to the shipping item is gathered.

At 1106, the reference joint item-device configuration value based at least on the respective information gathered during the second period of time from both the first and the second wireless communications data provider device is calculated.

Figure 12:
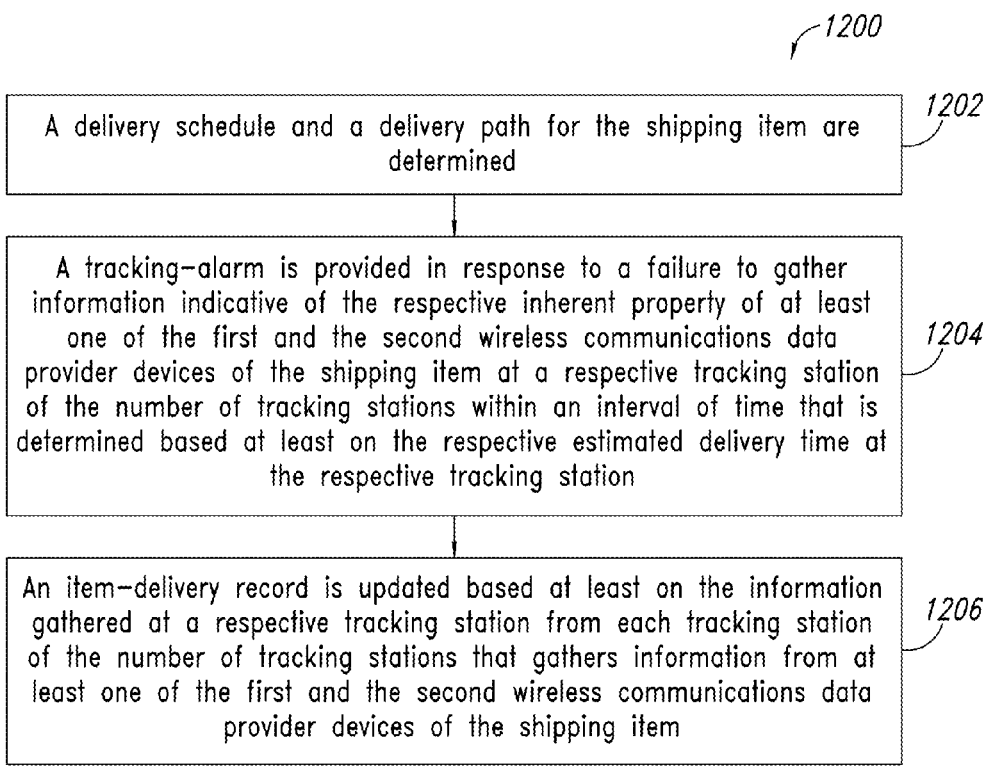
FIG. 12 is a flow diagram of a process of operate a delivery and stealth tracking system according to one non-limiting illustrated embodiment.

At 1108, the reference joint item-device configuration value is stored. FIG. 12 is a flow diagram of a process 1200 of operating a delivery and stealth tracking system according to one non-limiting illustrated embodiment. The process 1200 may include some or all of the process 700 of FIG. 7.

At 1202, a delivery schedule and a delivery path for the shipping item is determined. The delivery path extends between at least a current physical location of the shipping item and a physical destination location. The delivery path includes a number of tracking stations, and the delivery schedule includes a respective estimated delivery time at each respective tracking station of the number of tracking stations.

At 1204, a tracking-alarm is provided in response to a failure to gather information indicative of the respective inherent property of at least one of the first and the second wireless communications data provider devices of the shipping item at a respective tracking station of the number of tracking stations within an interval of time that is determined based at least on the respective estimated delivery time at the respective tracking station.

At 1206, an item delivery record is updated based at least on the information gathered at a respective tracking station for each tracking station of the number of tracking stations that gathers information from at least one of the first and the second wireless communications data provider devices of the shipping item.

Figure 13:
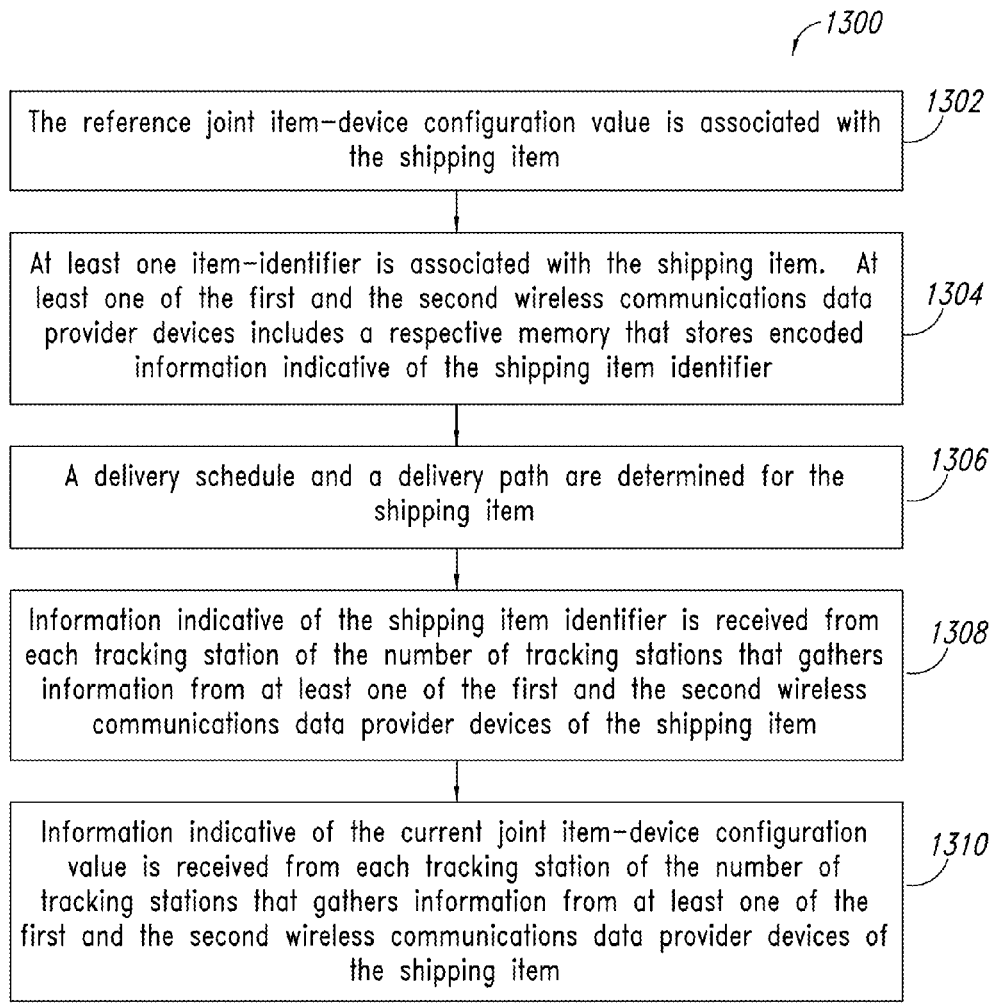
FIG. 13 is a flow diagram of a process of operate a delivery and stealth tracking system according to one non-limiting illustrated embodiment.

FIG. 13 is a flow diagram of a process 1300 of operating a delivery and stealth tracking system according to one non-limiting illustrated embodiment. The process 1300 may include some or all of the process 1100 of FIG. 11.

At 1302, the reference joint item-device configuration value is associated with the shipping item.

At 1304, at least one shipping item identifier is associated with the shipping item. At least one of the first and the second wireless communications data provider devices includes a respective memory that stores encoded information indicative of the shipping item identifier.

At 1306, a delivery schedule and a delivery path are determined for the shipping item. The delivery path extends between at least a current physical location of the shipping item and a physical destination location. The delivery path includes a number of tracking stations, and the delivery schedule includes a respective estimated delivery time at each respective tracking station of the number of tracking stations.

At 1308, information indicative of the shipping item identifier is received for each tracking station of the number of tracking stations that gathers information from at least one of the first and the second wireless communications data provider devices of the shipping item.

At 1310, receiving information indicative of the current joint item-device configuration value for each tracking station of the number of tracking stations that gathers information from at least one of the first and the second wireless communications data provider devices of the shipping item is received.

Figure 14:
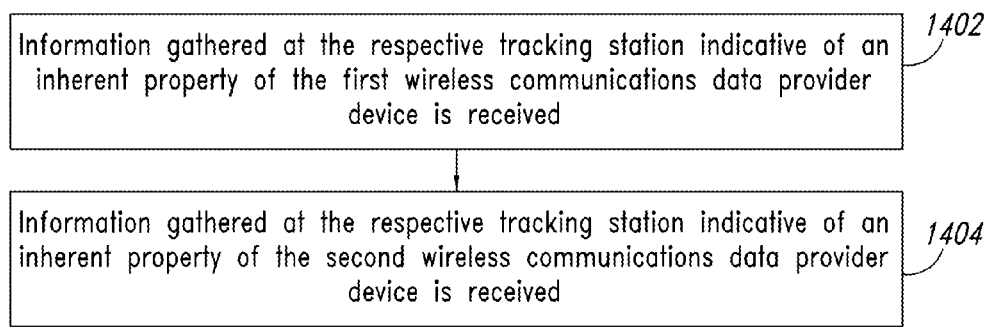
FIG. 14 is a flow diagram of a process of operate a delivery and stealth tracking system according to one non-limiting illustrated embodiment.

FIG. 14 is a flow diagram of a process 1400 of operating a delivery and stealth tracking system according to one non-limiting illustrated embodiment. The process 1400 may include some or all of the process 1300 of FIG. 13.

At 1402, information gathered at the respective tracking station indicative of an inherent property of the first wireless communications data provider device is received.

At 1404, information gathered at the respective tracking station indicative of an inherent property of the second wireless communications data provider device is received.

Figure 15:
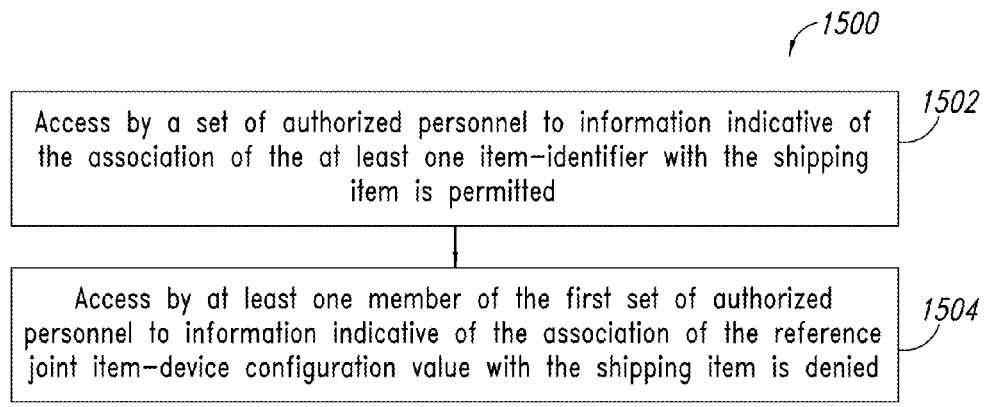
FIG. 15 is a flow diagram of a process of operate a delivery and stealth tracking system according to one non-limiting illustrated embodiment.

FIG. 15 is a flow diagram of a process 1500 of operating a delivery and stealth tracking system according to one non-limiting illustrated embodiment. The process 1500 may include some or all of the process 1400 of FIG. 14.

At 1502, access by a set of authorized personnel to information indicative of the association of the at least one shipping item identifier with the shipping item is permitted.

At 1504, access by at least one member of the first set of authorized personnel to information indicative of the association of the reference joint item-device configuration value with the shipping item is denied.

Figure 16:
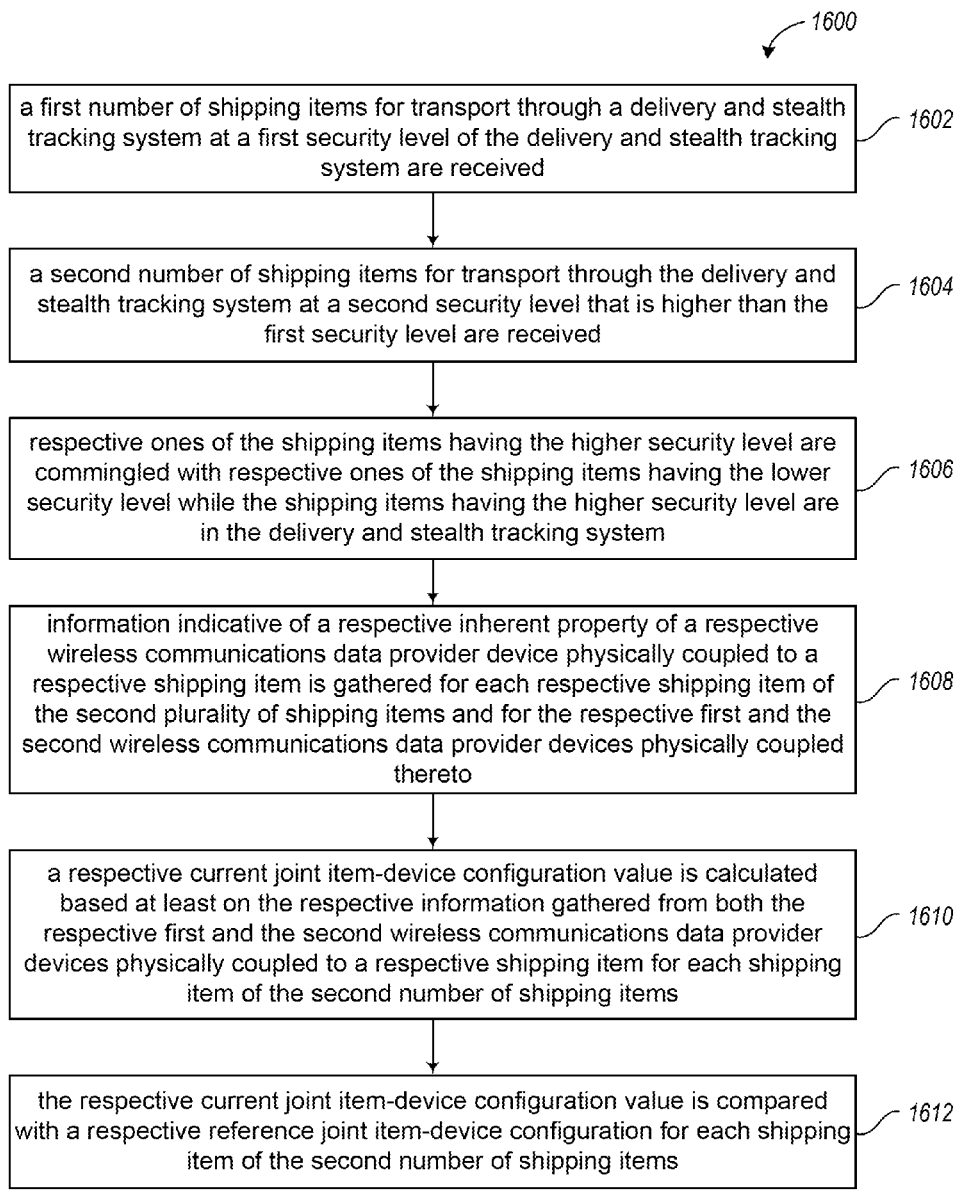
FIG. 16 is a flow diagram of a process of operate a delivery and stealth tracking system according to one non-limiting illustrated embodiment.

FIG. 16 is a flow diagram of a process 1600 of operating a delivery and stealth tracking system according to one non-limiting illustrated embodiment.

At block 1602, a first number of shipping items for transport through a delivery and stealth tracking system at a first security level of the delivery and stealth tracking system are received.

At block 1604, a second number of shipping items for transport through the delivery and stealth tracking system at a second security level that is higher than the first security level are received. Typically, shipping items with a high security level will carry at least two wireless communications data provider devices. Typically, shipping items with a low security level may carry a single wireless communications data provider device, which enables the delivery and stealth tracking system to track low security level items.

At block 1606, respective ones of the shipping items having the higher security level are commingled with respective ones of the shipping items having the lower security level. Shipping items having differing security levels may be commingled while the respective shipping items are in the delivery and stealth tracking systems.

At block 1608, information indicative of a respective inherent property of a respective wireless communications data provider device physically coupled to a respective shipping item is gathered for each respective shipping item of the second plurality of shipping items and for the respective first and the second wireless communications data provider devices physically coupled thereto.

At block 1610, a respective current joint item-device configuration value based at least on the respective information gathered from both the respective first and the second wireless communications data provider devices physically coupled to a respective shipping item for each shipping item of the second number of shipping items is calculated.

At block 1612, the respective current joint item-device configuration value is compared with a respective reference joint item-device configuration for each shipping item of the second number of shipping items.

Figure 17:
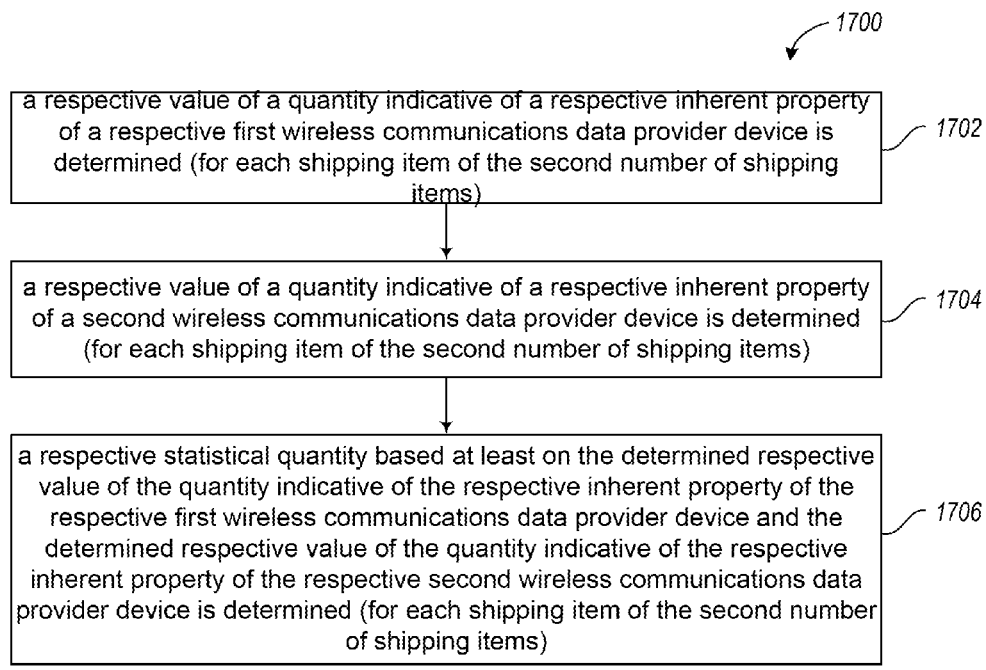
FIG. 17 is a flow diagram of a process of operate a delivery and stealth tracking system according to one non-limiting illustrated embodiment.

FIG. 17 is a flow diagram of a process 1700 of operating a delivery and stealth tracking system according to one non-limiting illustrated embodiment. The process 1700 may include some or all of the process 1600 of FIG. 16.

At block 1702, a respective value of a quantity indicative of the respective inherent property of a respective first wireless communications data provider device is determined for each shipping item of the second number of shipping items.

At block 1704, a respective value of a quantity indicative of the respective inherent property of the second wireless communications data provider device is determined for each shipping item of the second number of shipping items.

At block 1706, a respective statistical quantity based at least on the determined respective value of the quantity indicative of the respective inherent property of the respective first wireless communications data provider device and the determined respective value of the quantity indicative of the respective inherent property of the respective second wireless communications data provider device is determined for each shipping item of the second number of shipping items.

Figure 18:
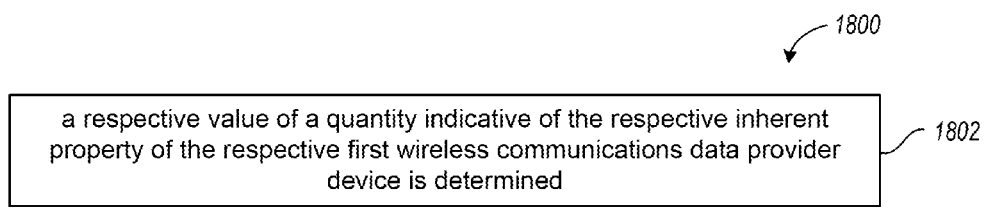
FIG. 18 is a flow diagram of a process of operate a delivery and stealth tracking system according to one non-limiting illustrated embodiment.

FIG. 18 is a flow diagram of a process 1800 of operating a delivery and stealth tracking system according to one non-limiting illustrated embodiment.

The process 1800 may include some or all of the process 1600 of FIG. 16.

At block 1802, respective ones of the shipping items having the higher security level are transported between a first point and a second point in the delivery and stealth tracking system together with respective ones of the shipping items having the lower security level.

Figure 19:
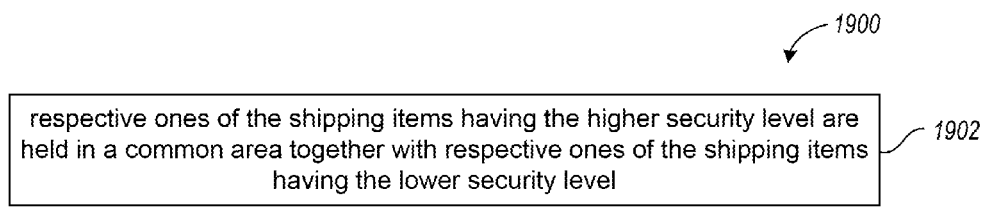
FIG. 19 is a flow diagram of a process of operate a delivery and stealth tracking system according to one non-limiting illustrated embodiment.

FIG. 19 is a flow diagram of a process 1900 of operating a delivery and stealth tracking system according to one non-limiting illustrated embodiment. The process 1900 may include some or all of the process 1600 of FIG. 16.

At block 1902, respective ones of the shipping items having the higher security level are held in a common area together with respective ones of the shipping items having the lower security level.

Figure 20:
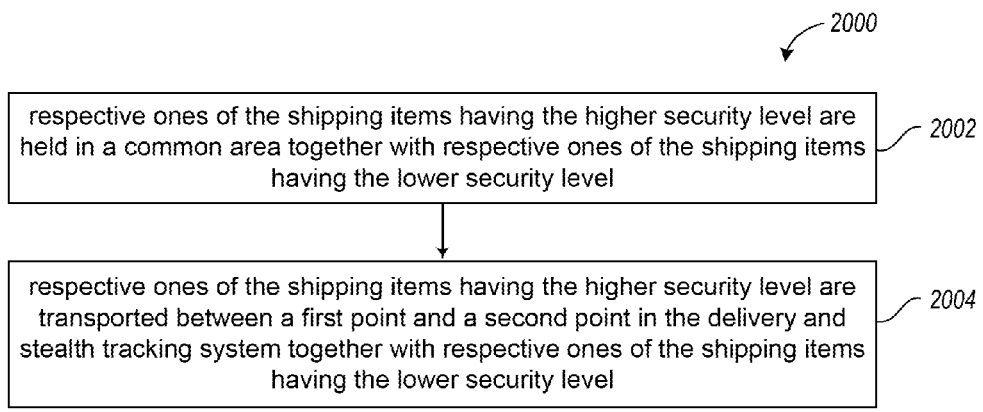
FIG. 20 is a flow diagram of a process of operate a delivery and stealth tracking system according to one non-limiting illustrated embodiment.

FIG. 20 is a flow diagram of a process 2000 of operating a delivery and stealth tracking system according to one non-limiting illustrated embodiment. The process 2000 may include some or all of the process 1600 of FIG. 16.

At block 2002, respective ones of the shipping items having the higher security level are held in a common area together with respective ones of the shipping items having the lower security level.

At block 2004, respective ones of the shipping items having the higher security level are transported between a first point and a second point in the delivery and stealth tracking system together with respective ones of the shipping items having the lower security level.

Figure 21:
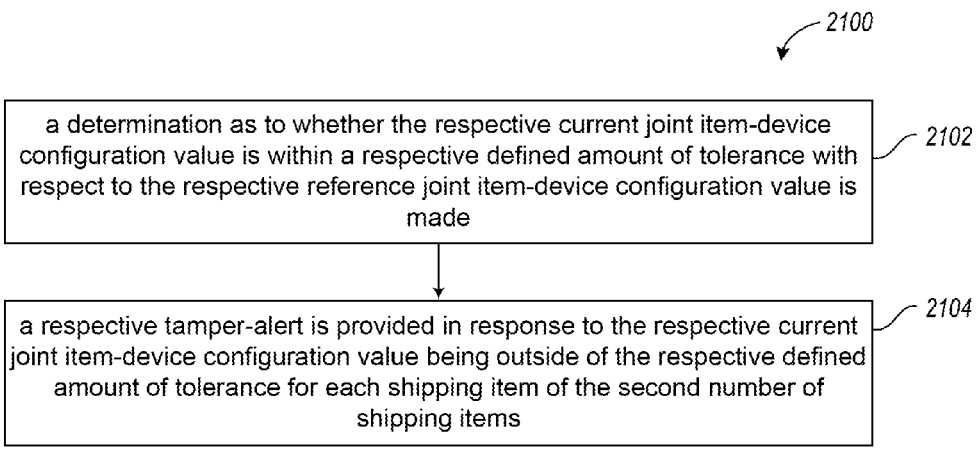
FIG. 21 is a flow diagram of a process of operate a delivery and stealth tracking system according to one non-limiting illustrated embodiment.

FIG. 21 is a flow diagram of a process 2100 of operating a delivery and stealth tracking system according to one non-limiting illustrated embodiment. The process 2100 may include some or all of the process 1600 of FIG. 16.

At block 2102, a determination as to whether the respective current joint item-device configuration value is within a respective defined amount of tolerance with respect to the respective reference joint item-device configuration value is made for each shipping item of the second number of shipping items. The determination may be based at least on the comparison of the respective current joint item-device configuration value with the respective reference joint item-device configuration value.

At block 2104, a respective a respective tamper-alert is provided in response to the respective current joint item-device configuration value being outside of the respective defined amount of tolerance for each shipping item of the second number of shipping items for each shipping item of the second number of shipping items.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a delivery and stealth tracking system, the method comprising:
   during a first period of time, wirelessly gathering information indicative of an inherent property of a first wireless communications data provider device physically coupled to a shipping item with a first wireless communications data reader device;
   during the first period of time, wirelessly gathering information indicative of an inherent property of a second wireless communications data provider device physically coupled to the shipping item with the first wireless communications data reader device;
   calculating a current joint item-device configuration value based at least on the respective information gathered during the first period of time from both the first and the second wireless communications data provider device; and
   comparing the current joint item-device configuration value with a reference joint item-device configuration value, wherein the reference joint item-device configuration value was previously calculated based at least on respective information previously gathered during a second period of time preceding the first period of time from both the first and the second wireless communications data provider devices
   determining a delivery schedule and a delivery path for the shipping item, wherein the delivery path includes a number of tracking stations, and the delivery schedule includes a respective estimated delivery time at each respective tracking station of the number of tracking stations;
   providing a tracking-alarm in response to a failure to gather information indicative of the respective inherent property of at least one of the first and the second wireless communications data provider devices of the shipping item at a respective tracking station of the number of tracking stations within an interval of time that is determined based at least on the respective estimated delivery time at the respective tracking station; and
   for each tracking station of the number of tracking stations that gathers information from at least one of the first and the second wireless communications data provider devices of the shipping item, updating an item delivery record based at least on the information gathered at the respective tracking station.

2. The method of claim 1 wherein calculating a current joint item-device configuration value based at least on the respective information gathered during the first period of time from both the first and the second wireless communications data provider device includes:
   determining a respective value of a quantity indicative of the inherent property of the first wireless communications data provider device;
   determining a respective value of a quantity indicative of the inherent property of the second wireless communications data provider device; and
   determining a statistical quantity based at least on the determined respective value of the quantity indicative of the inherent property of the first wireless communications data provider device and the determined respective value of the quantity indicative of the inherent property of the second wireless communications data provider device.

3. The method of claim 1 wherein comparing the current joint item-device configuration value with a reference joint item-device configuration value further includes determining whether the current joint item-device configuration value is within a defined amount of tolerance with respect to the reference joint item-device configuration value based at least on the comparison of the current joint item-device configuration value with the reference joint item-device configuration value; and further including providing a tamper-alert in response to the current joint item-device configuration value being outside of the defined amount of tolerance.

4. The method of claim 1 wherein the respective inherent property of the first and of the second wireless communications data provider device is a respective amount of impedance, and wherein calculating a current joint item-device configuration value based at least on the respective information gathered during the first period of time from both the first and the second wireless communications data provider device includes:
   determining a respective value of a first amount of electromagnetic energy, $E_a$, received from the first wireless communications data provider device during the first period of time having a defined duration;
   determining a respective value of a second amount of electromagnetic energy, $E_b$, received from the second wireless communications data provider device during a second period of time having a duration that matches the duration of the first period of time; and
   determining a ratio between the determined respective value of the first amount of electromagnetic energy, $E_a$, and the determined respective value of the first amount of electromagnetic energy, $E_b$.

5. The method of claim 1, further comprising:
   during the second period of time, wirelessly gathering information indicative of a respective inherent property of a first wireless communications data provider device physically coupled to the shipping item with a second wireless communications data reader device;
   during the second period of time, wirelessly gathering information indicative of a respective inherent property of a second wireless communications data provider device physically coupled to the shipping item with the second wireless communications data reader device;
   calculating the reference joint item-device configuration value based at least on the respective information gathered during the second period of time from both the first and the second wireless communications data provider device; and storing the reference joint item-device configuration value.

6. The method of claim 5, further comprising:

logically associating the reference joint item-device configuration value with the shipping item;

logically associating at least one shipping item identifier with the shipping item, wherein at least one of the first and the second wireless communications data provider devices includes a respective memory that stores encoded information indicative of the shipping item identifier;

determining a delivery schedule and a delivery path for the shipping item, the delivery path extending between at least a current physical location of the shipping item and a physical destination location, wherein the delivery path includes a number of tracking stations, and the delivery schedule includes a respective estimated delivery time at each respective tracking station of the number of tracking stations;

for each tracking station of the number of tracking stations that gathers information from at least one of the first and the second wireless communications data provider devices of the shipping item, receiving information indicative of the shipping item identifier; and for each tracking station of the number of tracking stations that gathers information from at least one of the first and the second wireless communications data provider devices of the shipping item, receiving information indicative of the current joint item-device configuration value.

7. The method of claim 6 wherein receiving information indicative of the current joint item-device configuration value includes:

receiving information gathered at the respective tracking station indicative of an inherent property of the first wireless communications data provider device; and receiving information gathered at the respective tracking station indicative of inherent property of the second wireless communications data provider device.

8. The method of claim 7, further comprising:

permitting access by a set of authorized personnel to information indicative of the logical association of the at least one shipping item identifier with the shipping item; and denying access by at least one member of the first set of authorized personnel to information indicative of the logical association of the reference joint item-device configuration value with the shipping item.

9. A surreptitious tracking system for tracking of a shipping item through a shipping and delivery system, comprising:

a plurality of tracking stations geographically distributed in the shipping and delivery system, each tracking station configured to wirelessly gather stealth tracking information including an amount of information indicative of an inherent property of a respective first wireless communications data provider device and an amount of information indicative of an inherent property of a respective second wireless communications data provider device of a respective shipping item passing through the respective tracking station; and a stealth tracking system communicatively coupled to each tracking station of the plurality of tracking stations, the stealth tracking station configured to:

calculate a current joint item-device configuration value based at least on stealth tracking information received from a respective tracking station of the plurality of tracking stations, and compare the current joint item-device configuration value with a reference joint item-device configuration value;

determine a delivery schedule and a delivery path for a respective shipping item, wherein the delivery path includes a number of tracking stations, and the delivery schedule includes a respective estimated delivery time at each respective tracking station of the number of tracking stations;

provide a tracking-alarm in response to a failure to gather stealth tracking information at a respective tracking station of the number of tracking stations within an interval of time that is determined based at least on the respective estimated delivery time at the respective tracking station; and for each tracking station of the number of tracking stations that gathers stealth tracking information from the respective shipping item, update a respective item delivery record based at least on the stealth tracking information gathered at the respective tracking station.

10. The surreptitious tracking system of claim 9 wherein the calculation of a current joint item-device configuration value by the stealth tracking system includes the stealth tracking station being configured to:

determine a respective value of a quantity indicative of the inherent property of the first wireless communications data provider device based at least on the received stealth tracking information;

determine a respective value of a quantity indicative of the inherent property of the second wireless communications data provider device based at least on the received stealth tracking information; and determine a statistical quantity based at least on the determined respective value of the quantity indicative of the inherent property of the first wireless communications data provider device and the determined respective value of the quantity indicative of the inherent property of the second wireless communications data provider device.

11. The surreptitious tracking system of claim 9 wherein the stealth tracking system is configured to:

calculate the reference joint item-device configuration value based at least on stealth tracking information gathered during an initial check-in of a respective shipping item into the shipping and delivery system; and store the reference joint item-device configuration value.

* * * * *